US012634533B2

(12) United States Patent
Chen et al.

(10) Patent No.: US 12,634,533 B2
(45) Date of Patent: May 19, 2026

(54) OPTIMIZING CONTENT ITEM COMPRESSION FOR ADAPTIVE BITRATE STREAMING BY OVER-THE-TOP (OTT) PROVIDERS

(71) Applicant: Adeia Guides Inc., San Jose, CA (US)

(72) Inventors: Tao Chen, Palo Alto, CA (US); Christopher Phillips, Hartwell, GA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/758,844

(22) Filed: Jun. 28, 2024

(65) Prior Publication Data

US 2026/0006270 A1     Jan. 1, 2026

(51) Int. Cl.
*H04N 21/2365* (2011.01)
*H04N 21/234* (2011.01)

(52) U.S. Cl.
CPC . *H04N 21/23655* (2013.01); *H04N 21/23418* (2013.01)

(58) Field of Classification Search
CPC .................. H04N 21/23655; H04N 21/23418
USPC ...................................... 375/240.01
See application file for complete search history.

(56) References Cited

U.S. PATENT DOCUMENTS

| | | | |
|---|---|---|---|
| 12,088,821 B1 | 9/2024 | Waggoner | |
| 12,192,263 B2 | 1/2025 | Li et al. | |
| 12,382,116 B2 | 8/2025 | Chen | |
| 12,432,403 B2 | 9/2025 | Chen et al. | |
| 12,563,245 B2 | 2/2026 | Chen et al. | |
| 2015/0023404 A1* | 1/2015 | Li | H04L 65/612 375/240.02 |
| 2017/0055012 A1 | 2/2017 | Phillips et al. | |
| 2017/0070551 A1 | 3/2017 | Phillips et al. | |
| 2019/0208214 A1 | 7/2019 | Mao et al. | |
| 2021/0409796 A1 | 12/2021 | Mcgilvray et al. | |
| 2022/0264168 A1 | 8/2022 | Dahl et al. | |
| 2022/0286720 A1 | 9/2022 | Mcgilvray et al. | |
| 2023/0104270 A1 | 4/2023 | Wang et al. | |
| 2024/0073462 A1 | 2/2024 | Chen | |
| 2024/0305788 A1 | 9/2024 | Liu et al. | |
| 2024/0305842 A1 | 9/2024 | Liu et al. | |
| 2025/0080787 A1 | 3/2025 | Tashtarian et al. | |
| 2025/0088554 A1 | 3/2025 | Li et al. | |

(Continued)

OTHER PUBLICATIONS

U.S. Appl. No. 18/758,822, filed Jun. 28, 2024, Tao Chen.

(Continued)

*Primary Examiner* — Jeffery A Williams
(74) *Attorney, Agent, or Firm* — HG LAW LLP

(57) ABSTRACT

Systems and methods are disclosed for generating an adaptive bitrate ladder for a content item based on the actual quality of the content item. A broadcaster determines a quality score of a content item and multiplexes a message indicating the quality score with data packets of the content item to an OTT provider. The OTT provider uses the quality score to determine an ABR ladder with a set of bitrates for the content item. The OTT provider then encodes a plurality of portions of the content item for each bitrate. The OTT provider then generates a manifest indicating a portion of a URL corresponding to each portion and transmits the manifest to a client device.

12 Claims, 32 Drawing Sheets

(56) References Cited

U.S. PATENT DOCUMENTS

2026/0039888 A1    2/2026   Chen

OTHER PUBLICATIONS

U.S. Appl. No. 18/758,831, filed Jun. 28, 2024, Tao Chen.
Weixzia Zhang, et al., Blind Image Quality Assessment Using a Deep Bilinear Convolutional Neural Network, IEEE Transactions on Circuits and Systems for Video Technology 2020, vol. 30, No. 1.
Xin Xiong, et al., Rate-Distortion Optimization with Alternative References for UGC Video Compression, Mar. 11, 2023, International Conference on Acoustics, Speech, & Signal Processing 2023.
AI-Powered Per-Scence Live Encoding—by Anita Chen (Fraunhofer Fokus) (https://www.w3.org/2020/06/machine-learning-workshop/talks/ai_powered_per-scene_live-encoding_.html) (13 pages).
Per-Title Encode Optimization, Netflix Technology Blog, Follow 11 minute read, Dec. 14, 2015 (22 pages).
The Power of Per-Title Encoding, Yash Patadia, Updated on Aug. 5, 2024 (https://www.gumlet.com/learn/per-title-encoding/) (9 pages).

* cited by examiner

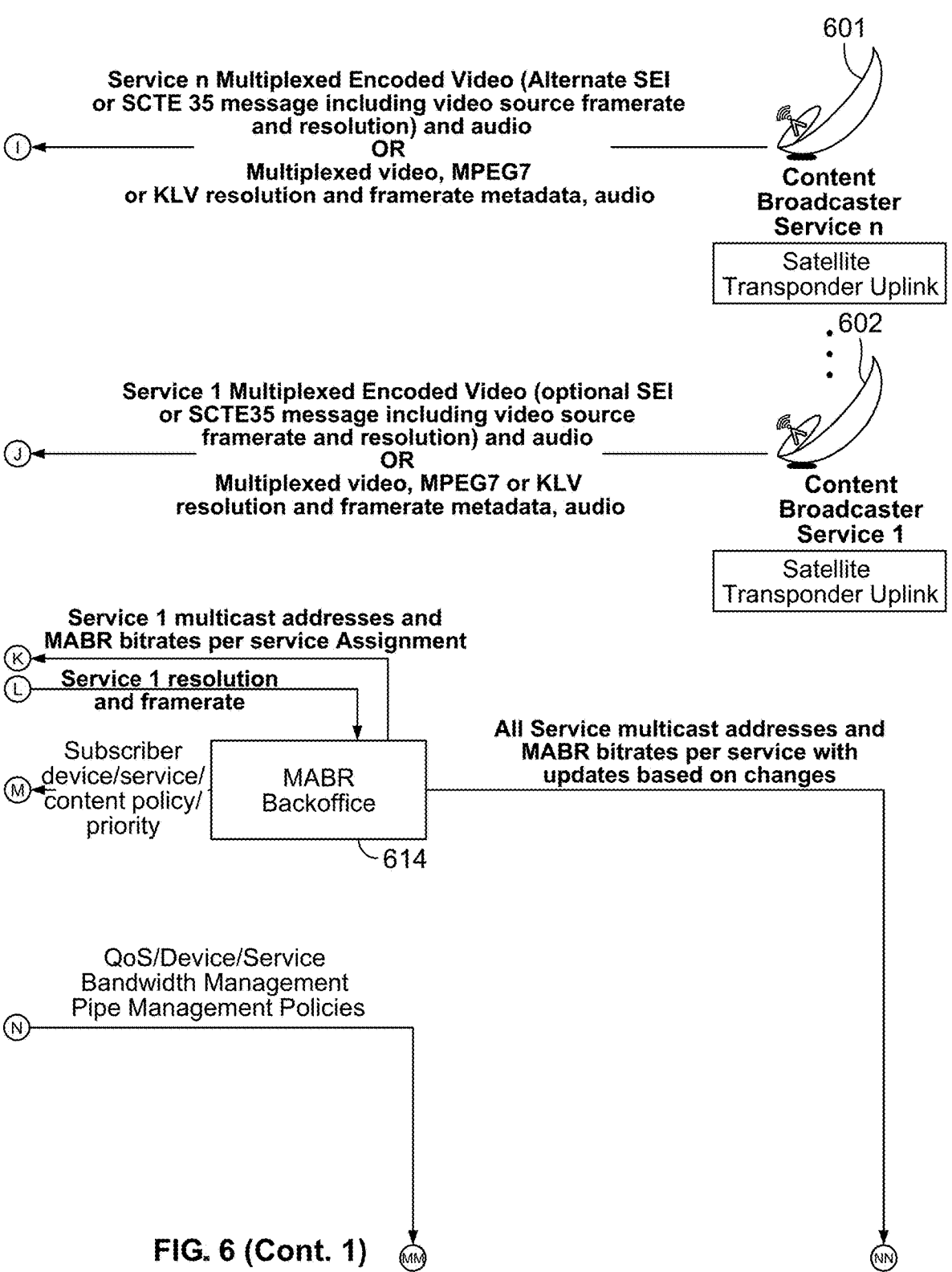
FIG. 6 (Cont. 1)

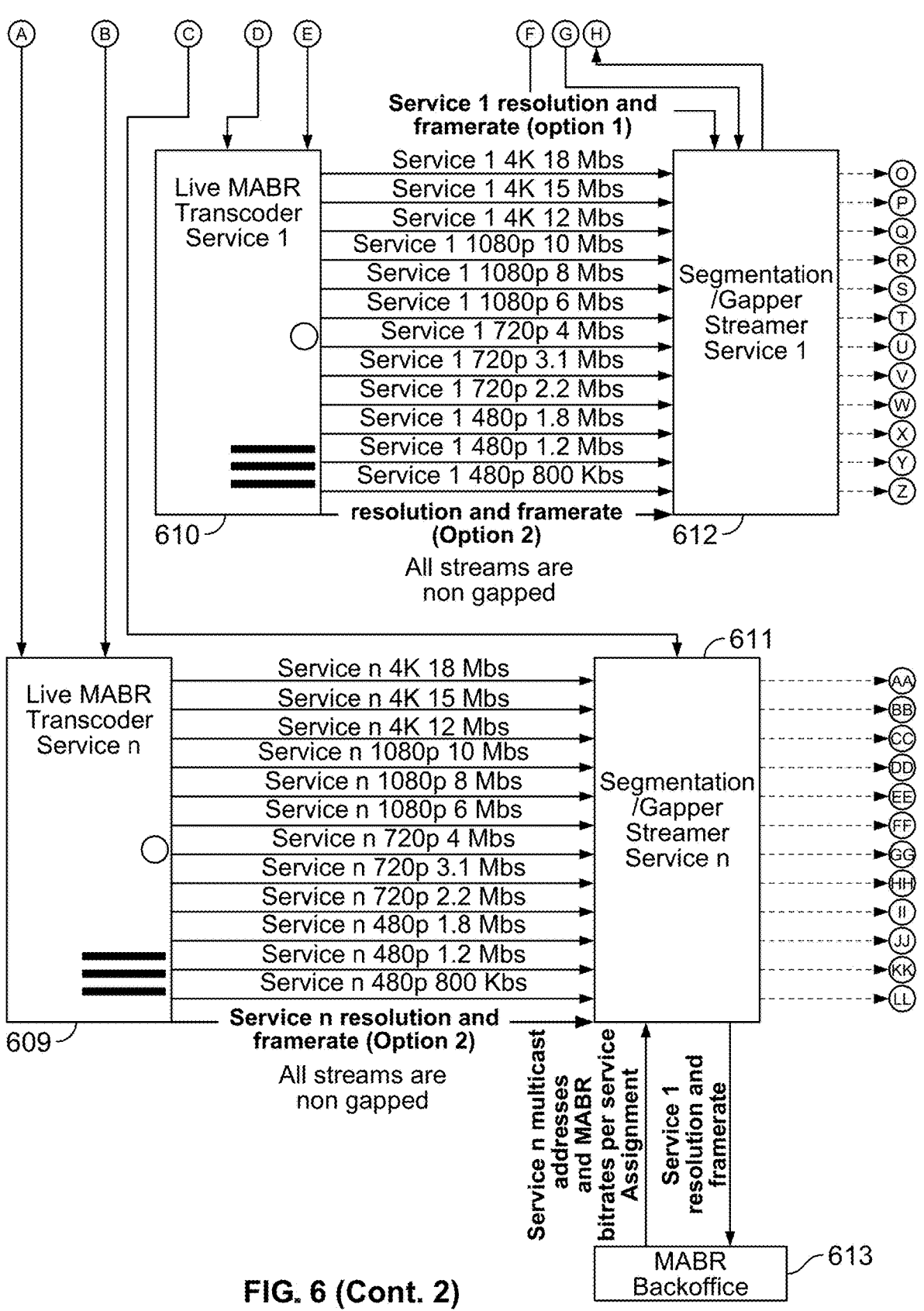
FIG. 6 (Cont. 2)

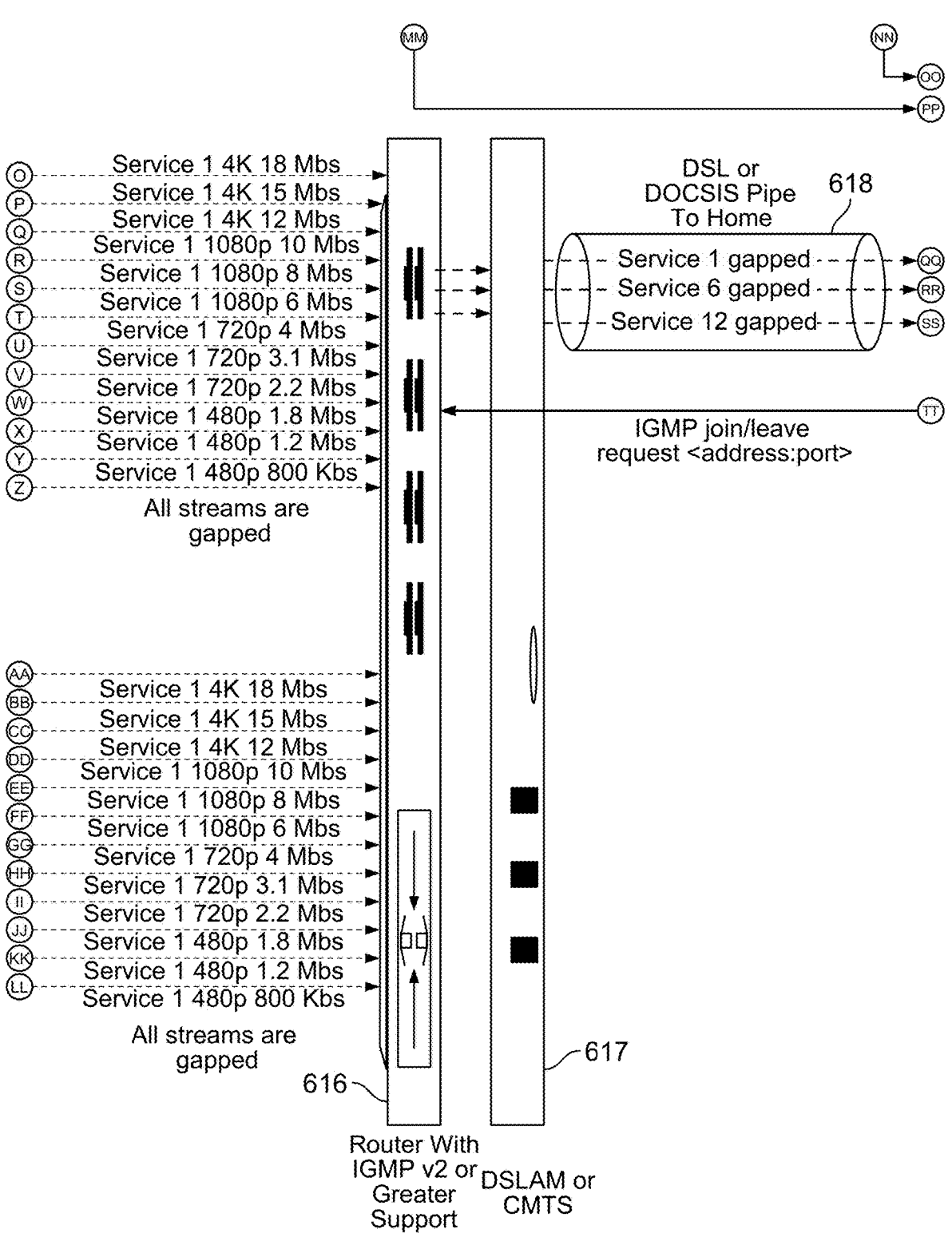
FIG. 6 (Cont. 3)

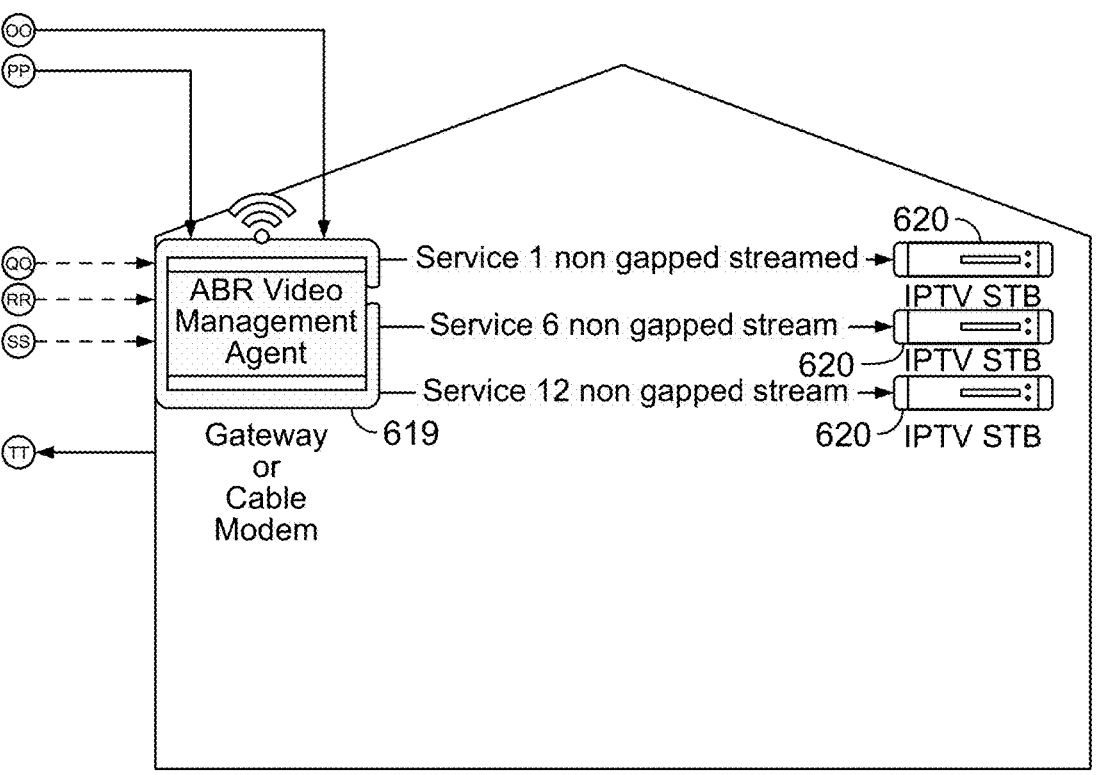
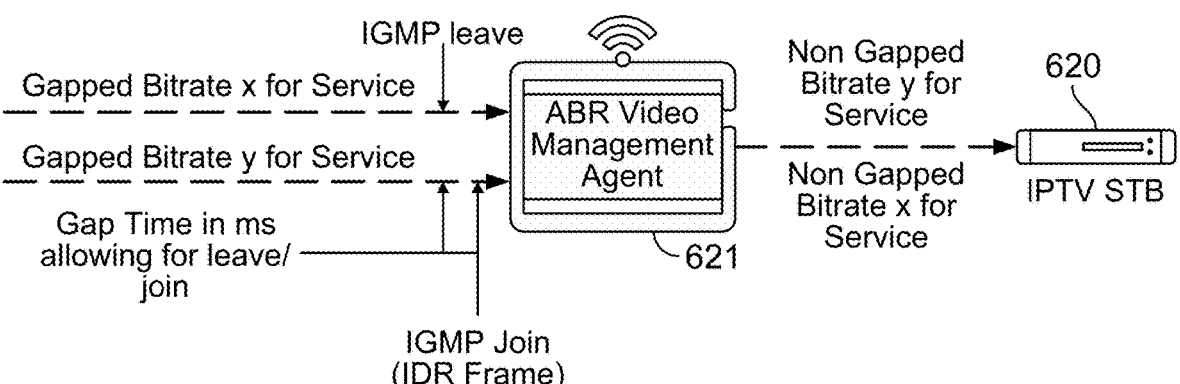
FIG. 6 (Cont. 4)

ABR Video Management Agent

619

Joined Service non gapped Stream

620

IPTV STB

A — Service multicast bitrates 720p 60 down

B — Before quality switched Joined Service Gapped Stream 720p 60 5 Mbs max

C — After quality Switched Joined Service Gapped Stream 720p 60 4 Mbs max

D — Service multicast bitrates 480p 30 down

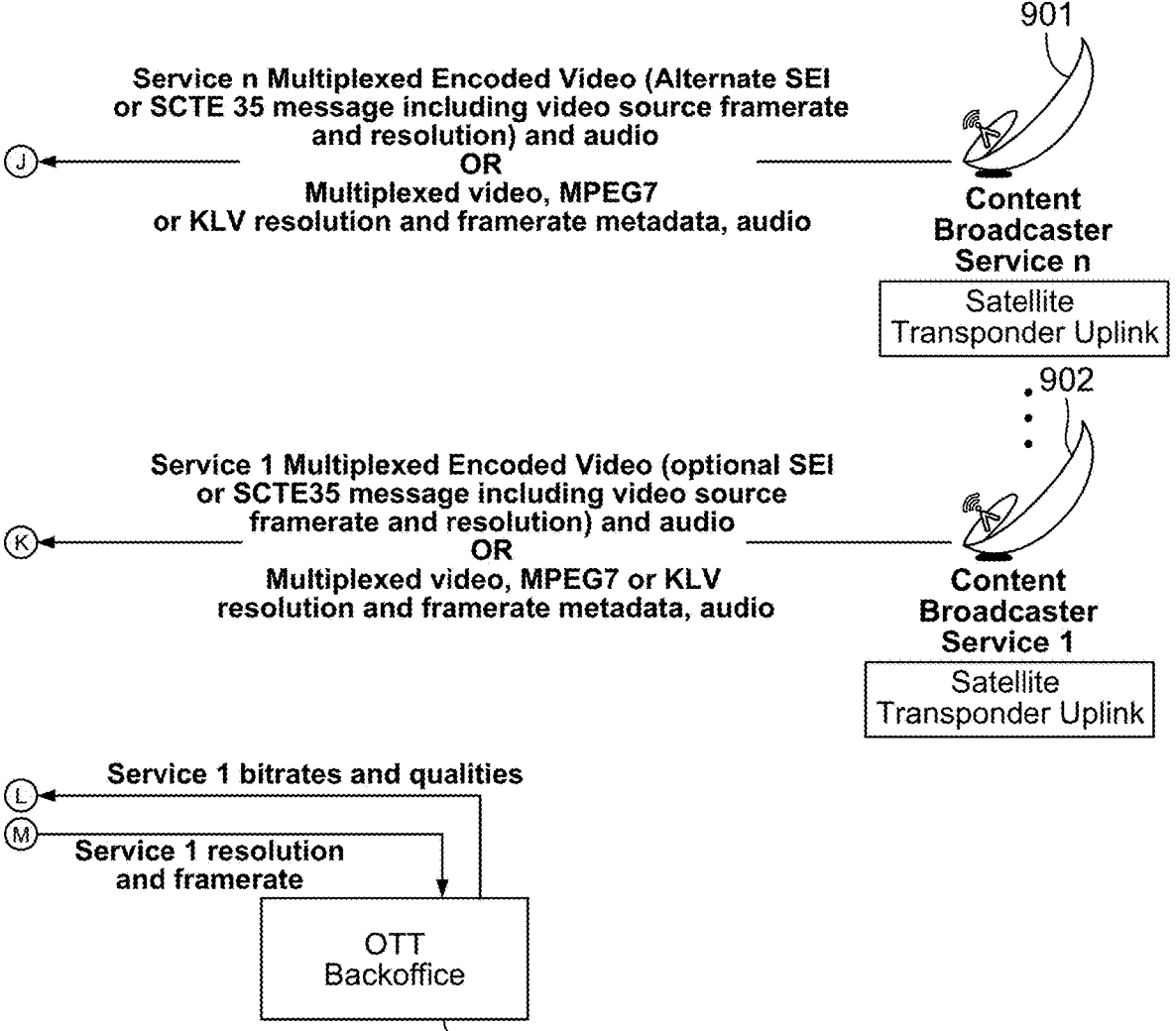
FIG. 9 (Cont. 1)

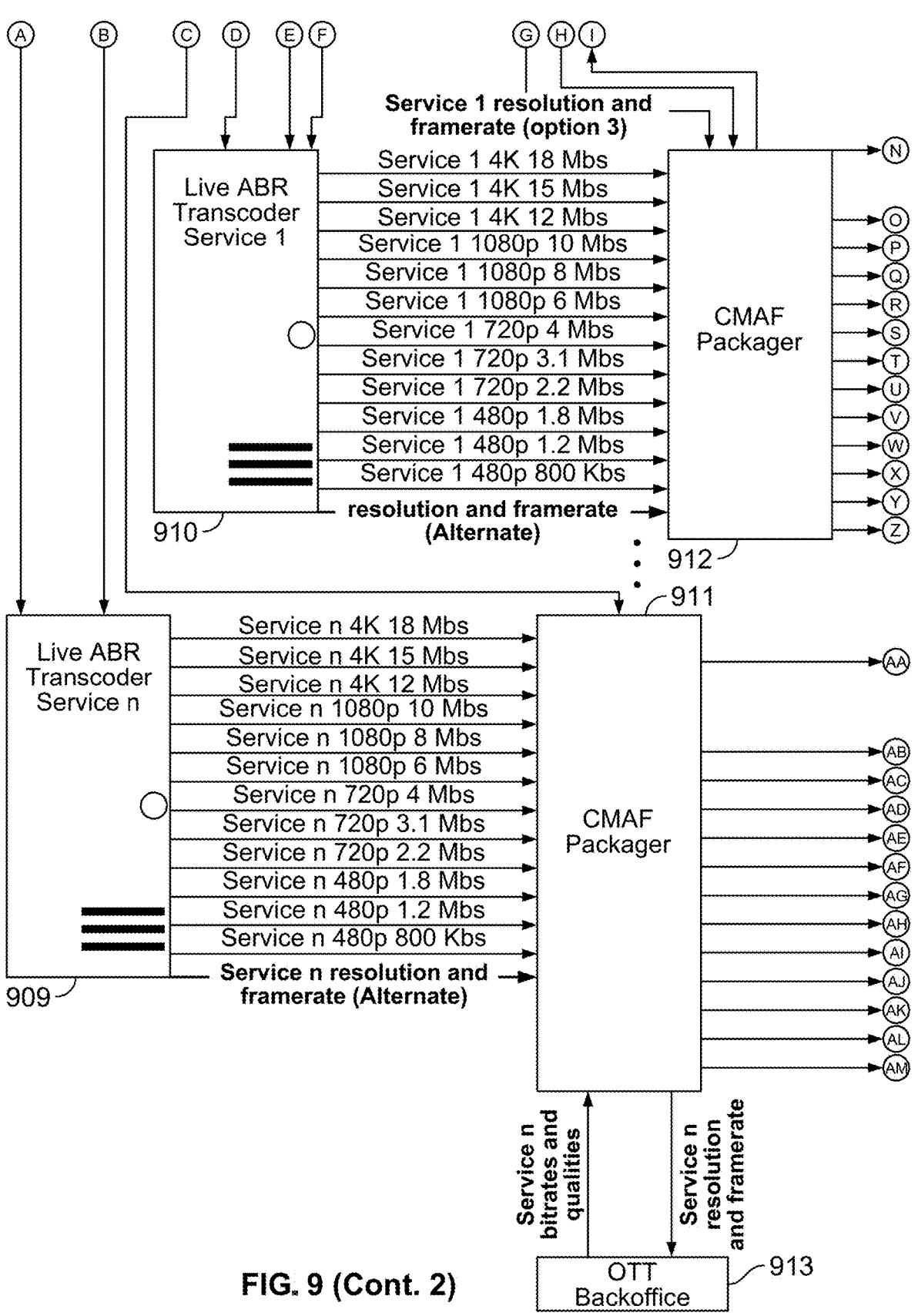
FIG. 9 (Cont. 2)

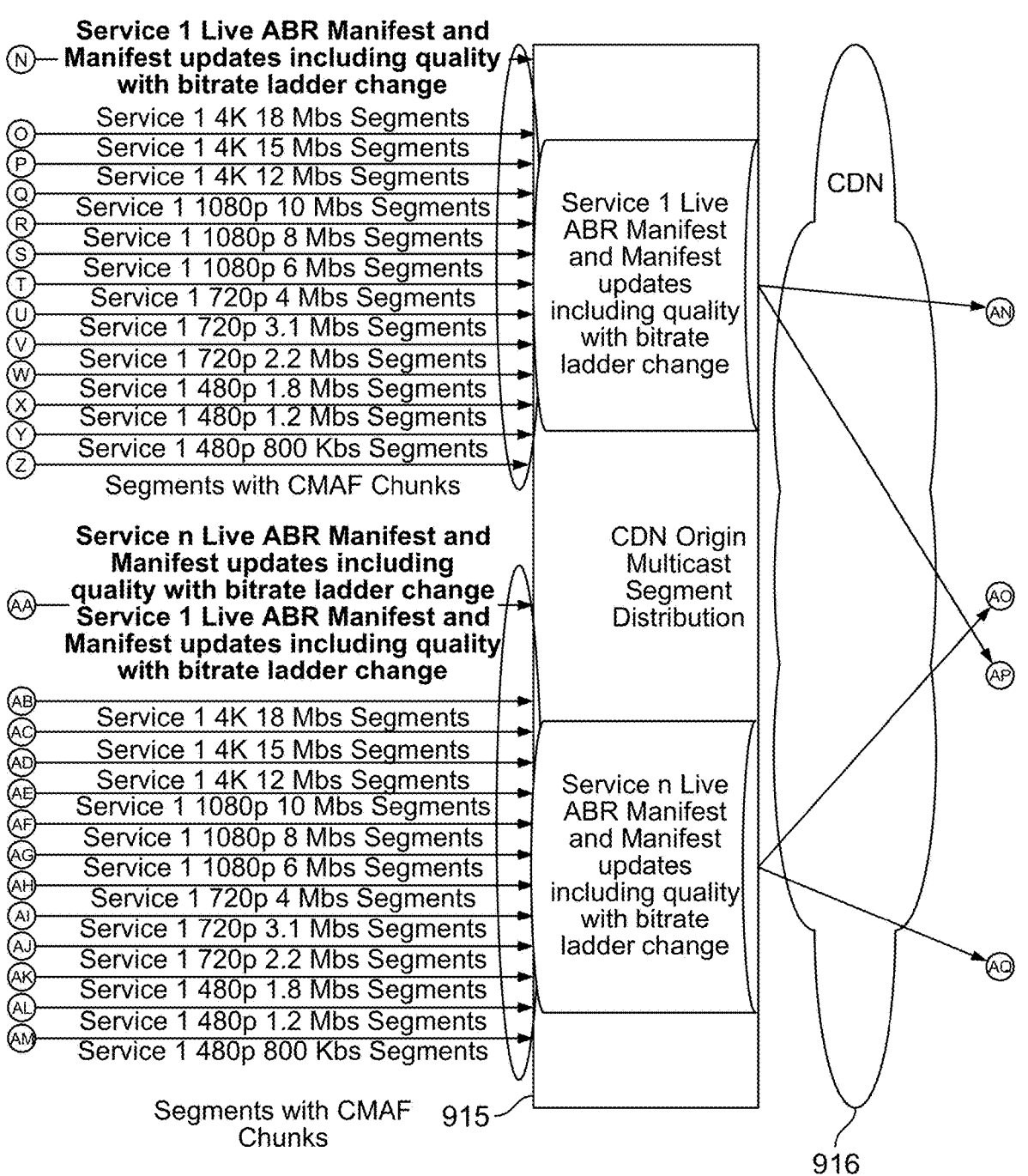
FIG. 9 (Cont. 3)

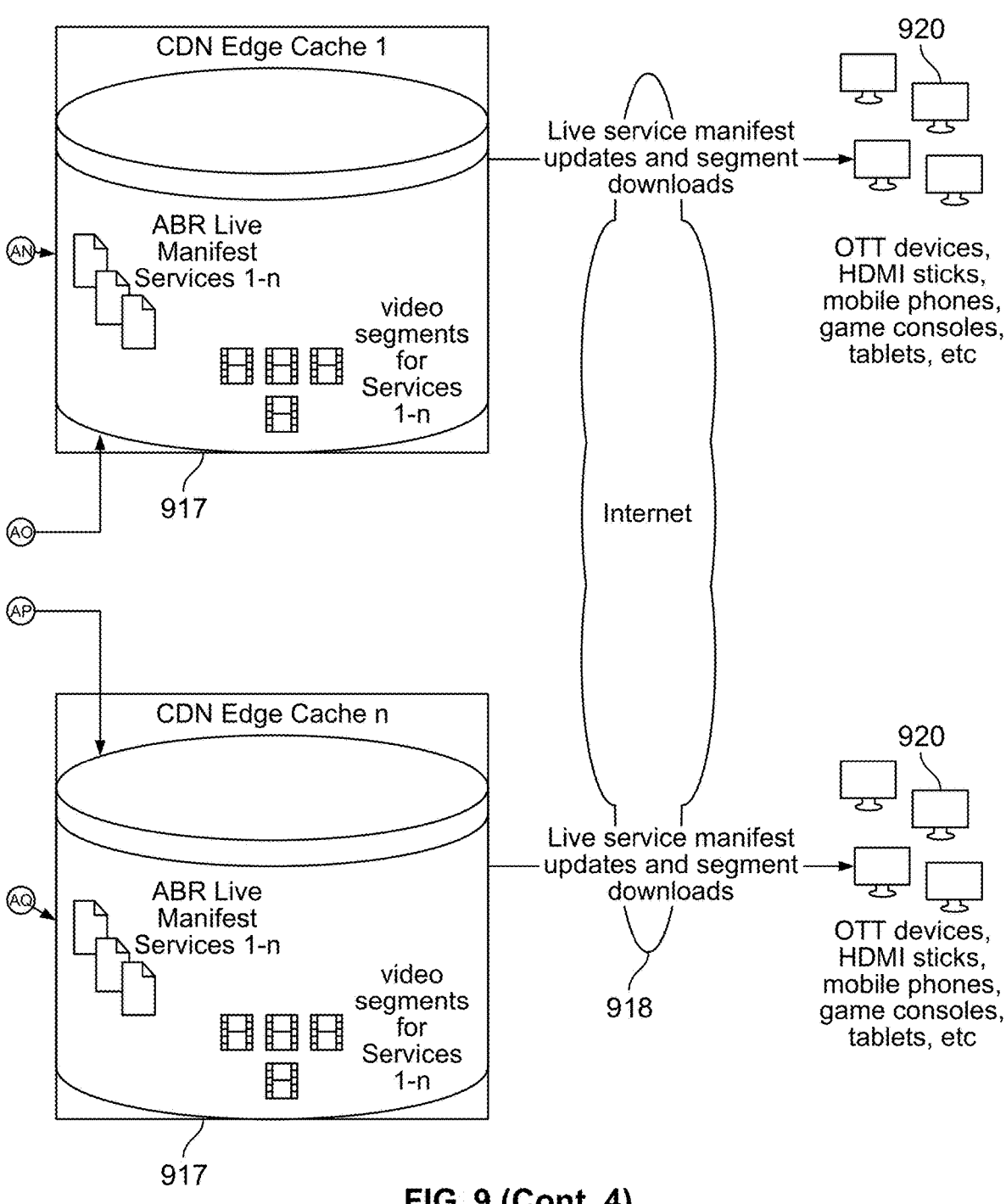
FIG. 9 (Cont. 4)

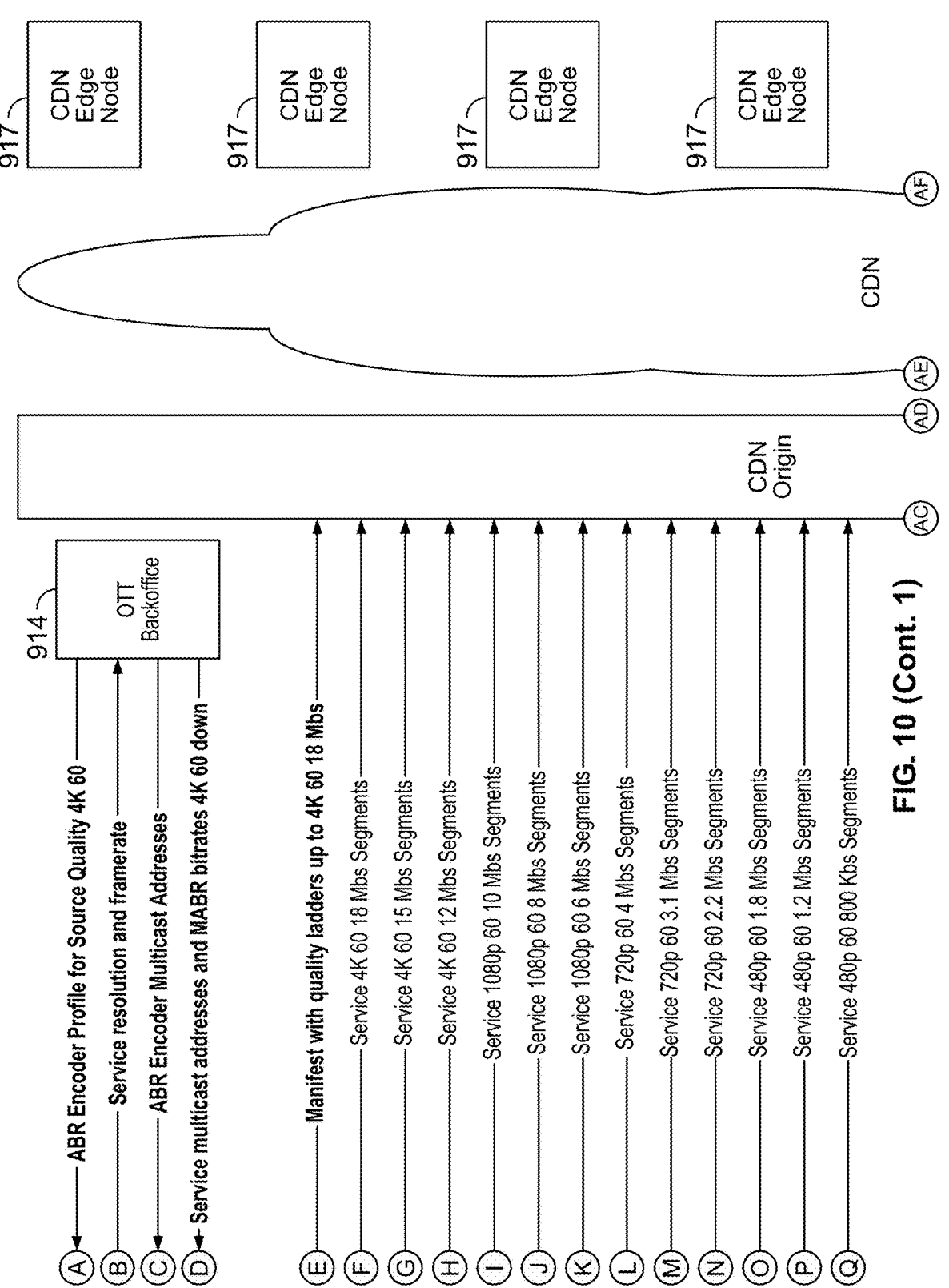
FIG. 10 (Cont. 1)

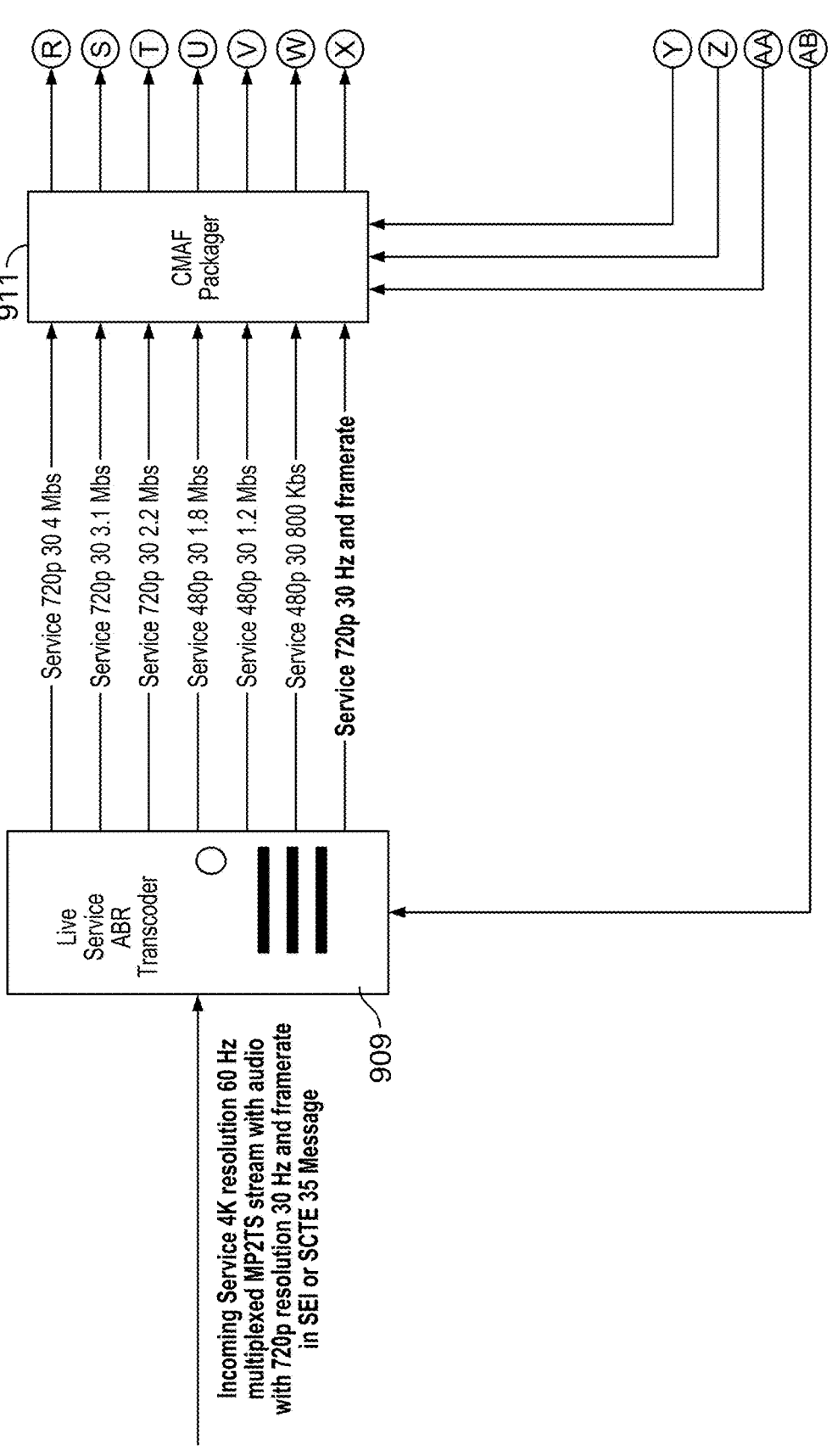
FIG. 10 (Cont. 2)

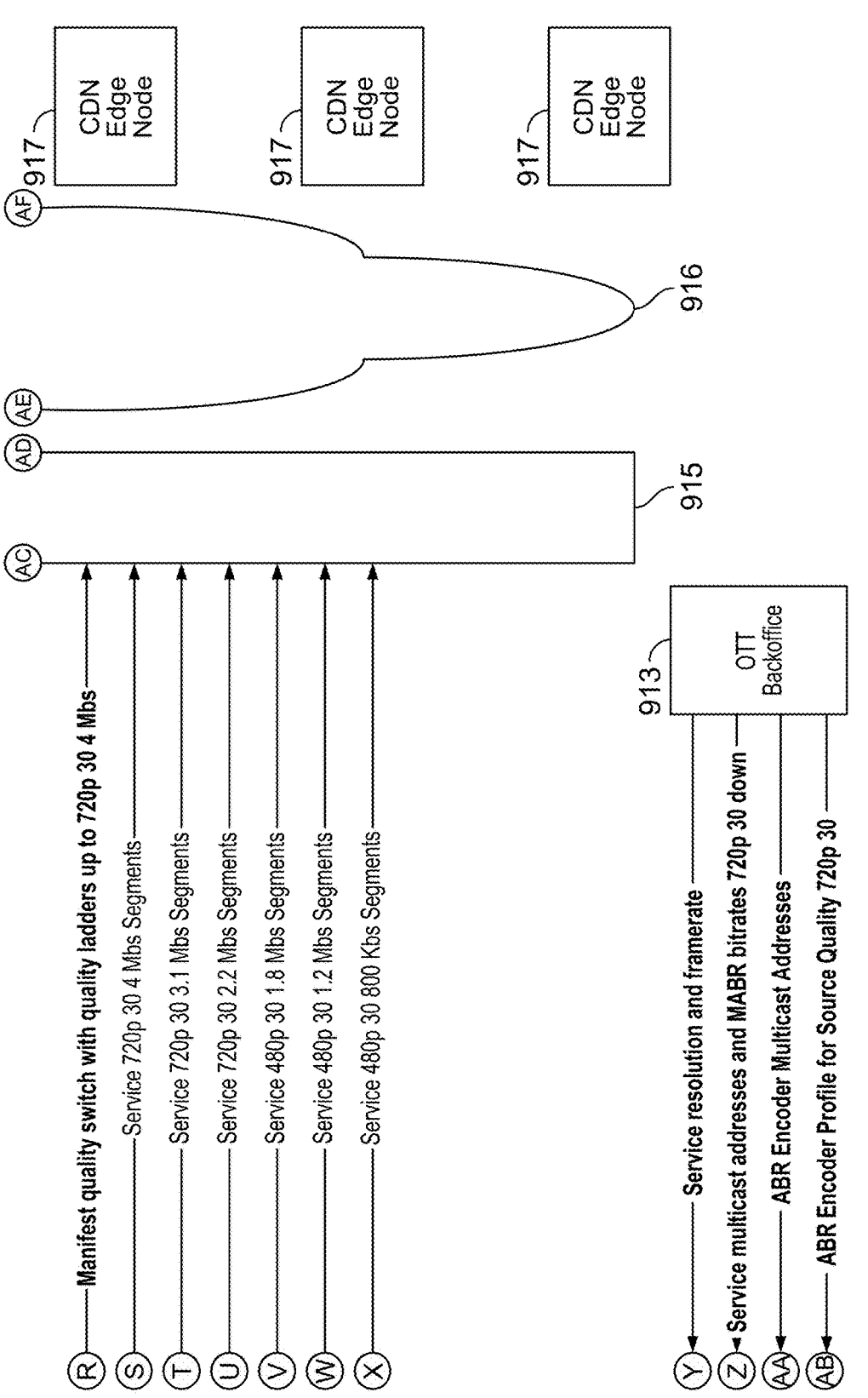
FIG. 10 (Cont. 3)

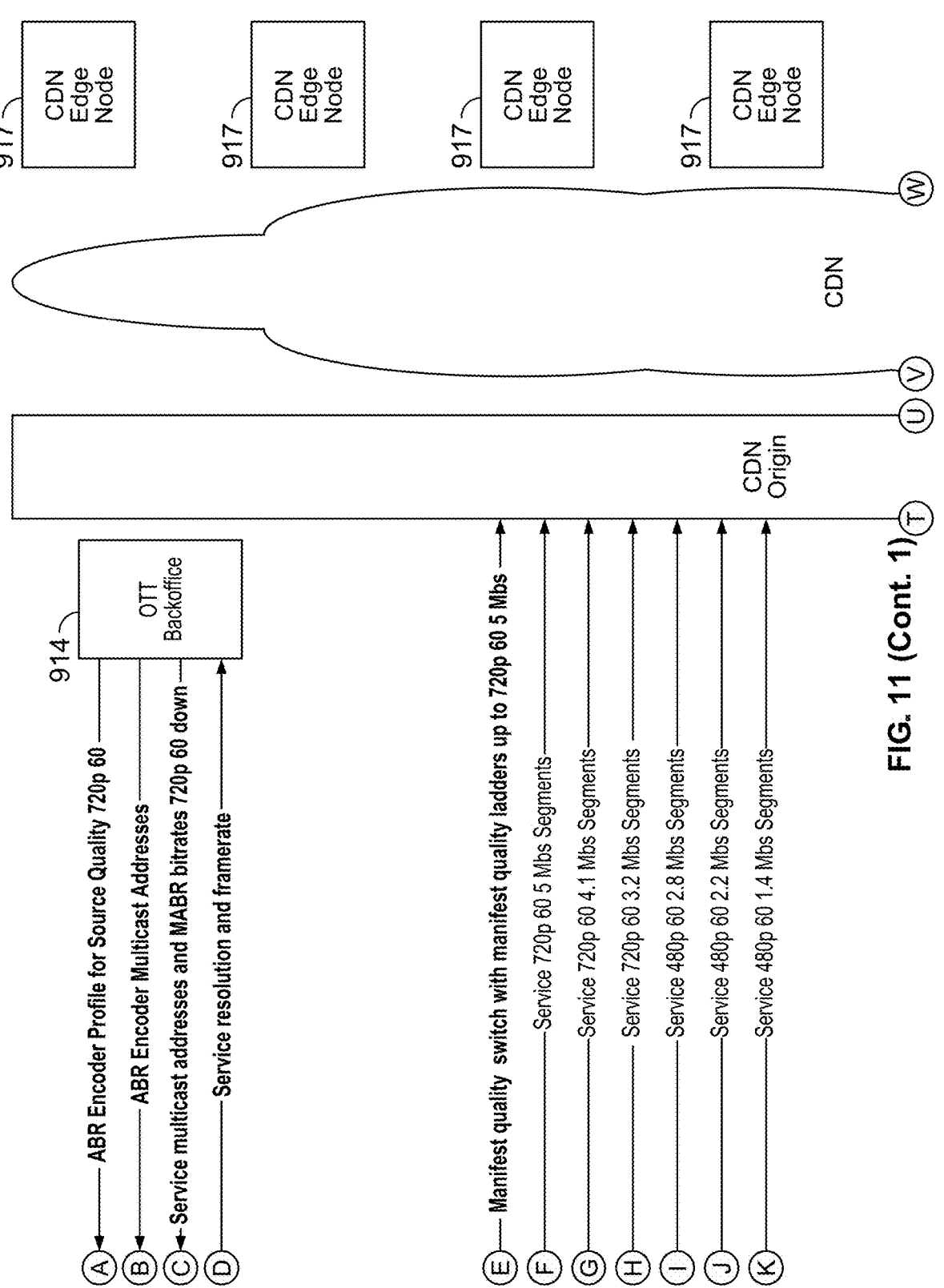
FIG. 11 (Cont. 1)

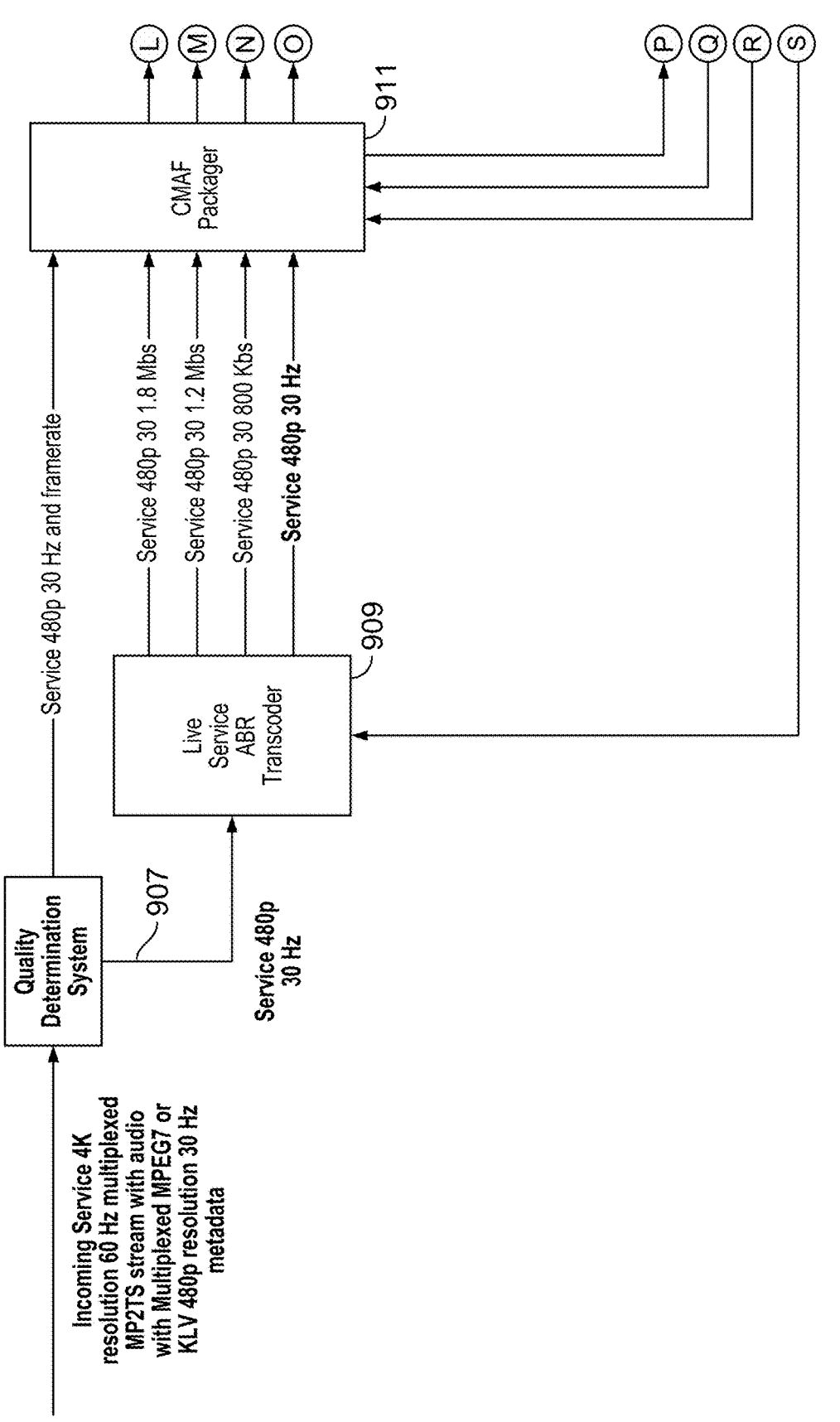
FIG. 11 (Cont. 2)

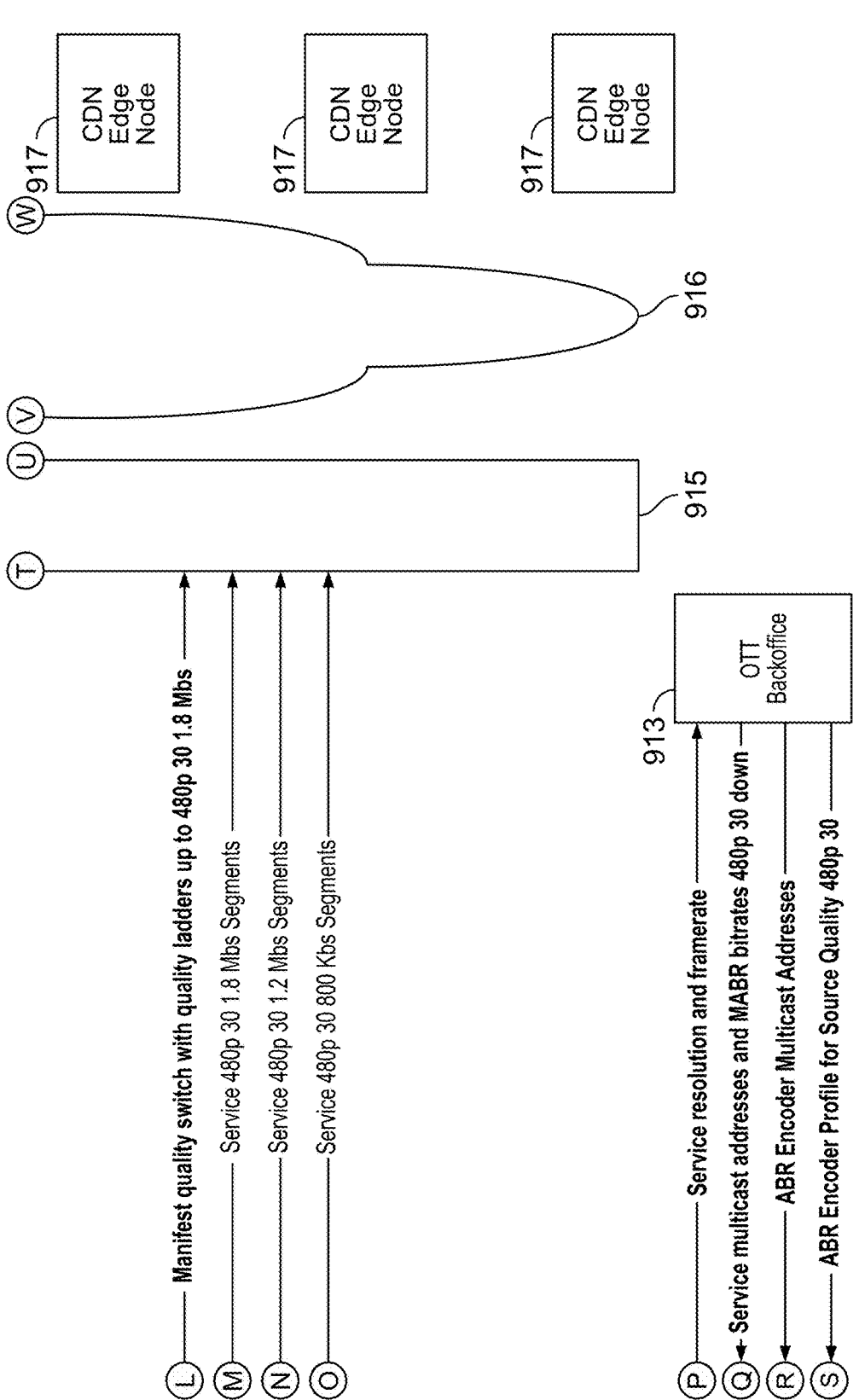
FIG. 11 (Cont. 3)

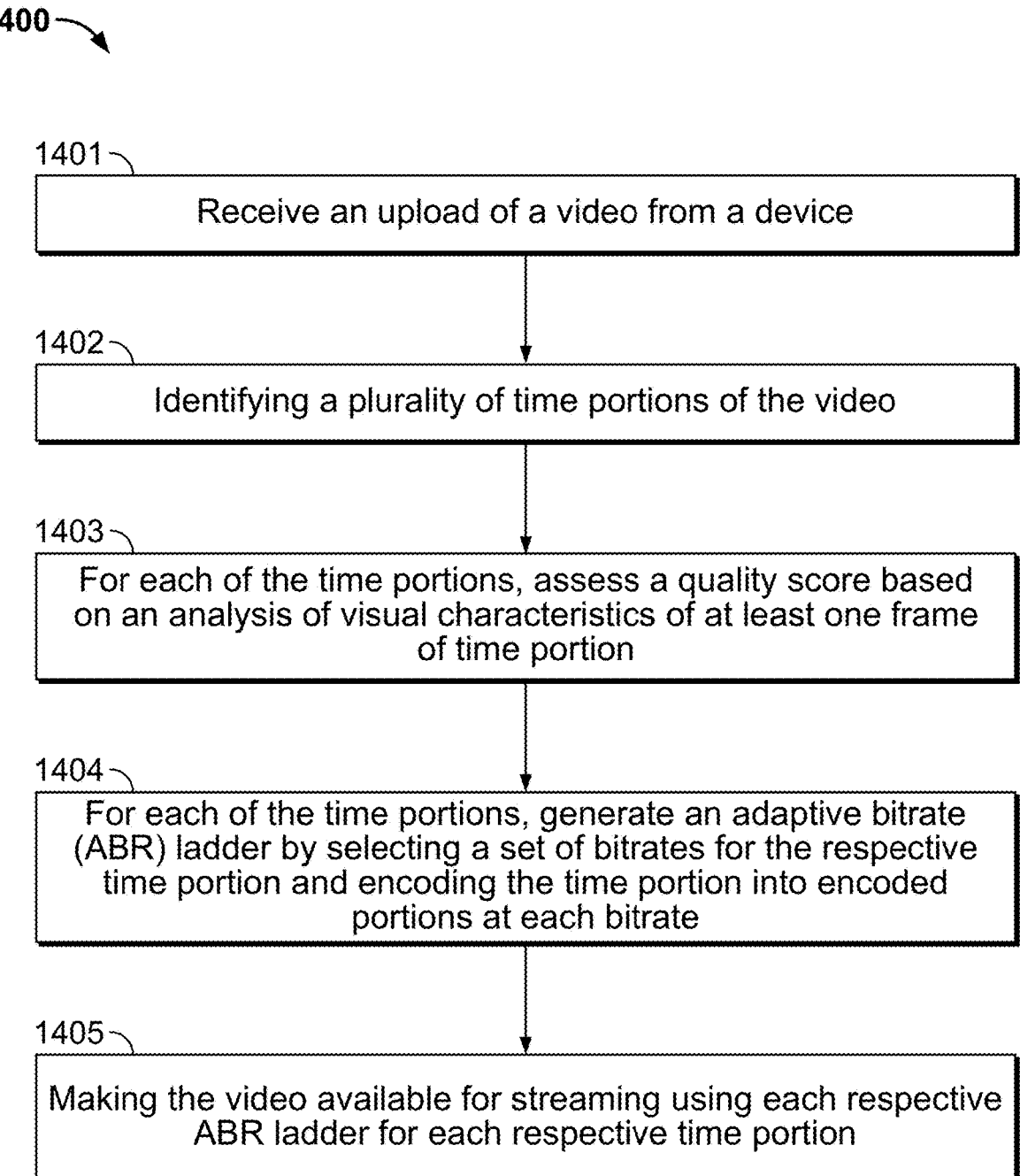

1400

1401
Receive an upload of a video from a device

1402
Identifying a plurality of time portions of the video

1403
For each of the time portions, assess a quality score based on an analysis of visual characteristics of at least one frame of time portion 1404
For each of the time portions, generate an adaptive bitrate (ABR) ladder by selecting a set of bitrates for the respective time portion and encoding the time portion into encoded portions at each bitrate 1405
Making the video available for streaming using each respective ABR ladder for each respective time portion

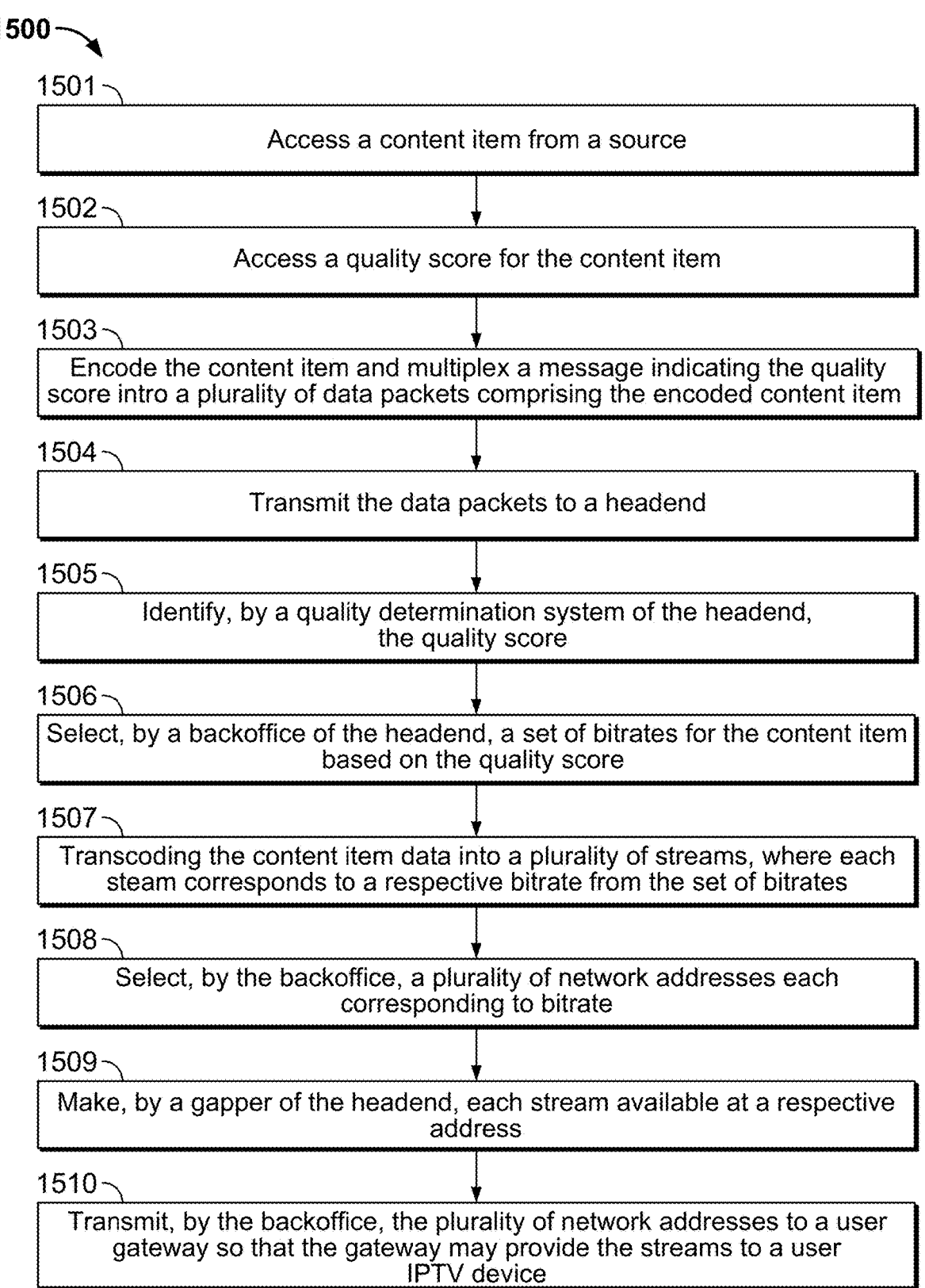

1501

Access a content item from a source

1502

Access a quality score for the content item

1503

Encode the content item and multiplex a message indicating the quality score intro a plurality of data packets comprising the encoded content item

1504

Transmit the data packets to a headend

1505

Identify, by a quality determination system of the headend, the quality score

1506

Select, by a backoffice of the headend, a set of bitrates for the content item based on the quality score

1507

Transcoding the content item data into a plurality of streams, where each steam corresponds to a respective bitrate from the set of bitrates

1508

Select, by the backoffice, a plurality of network addresses each corresponding to bitrate

1509

Make, by a gapper of the headend, each stream available at a respective address

1510

Transmit, by the backoffice, the plurality of network addresses to a user gateway so that the gateway may provide the streams to a user IPTV device

FIG. 15

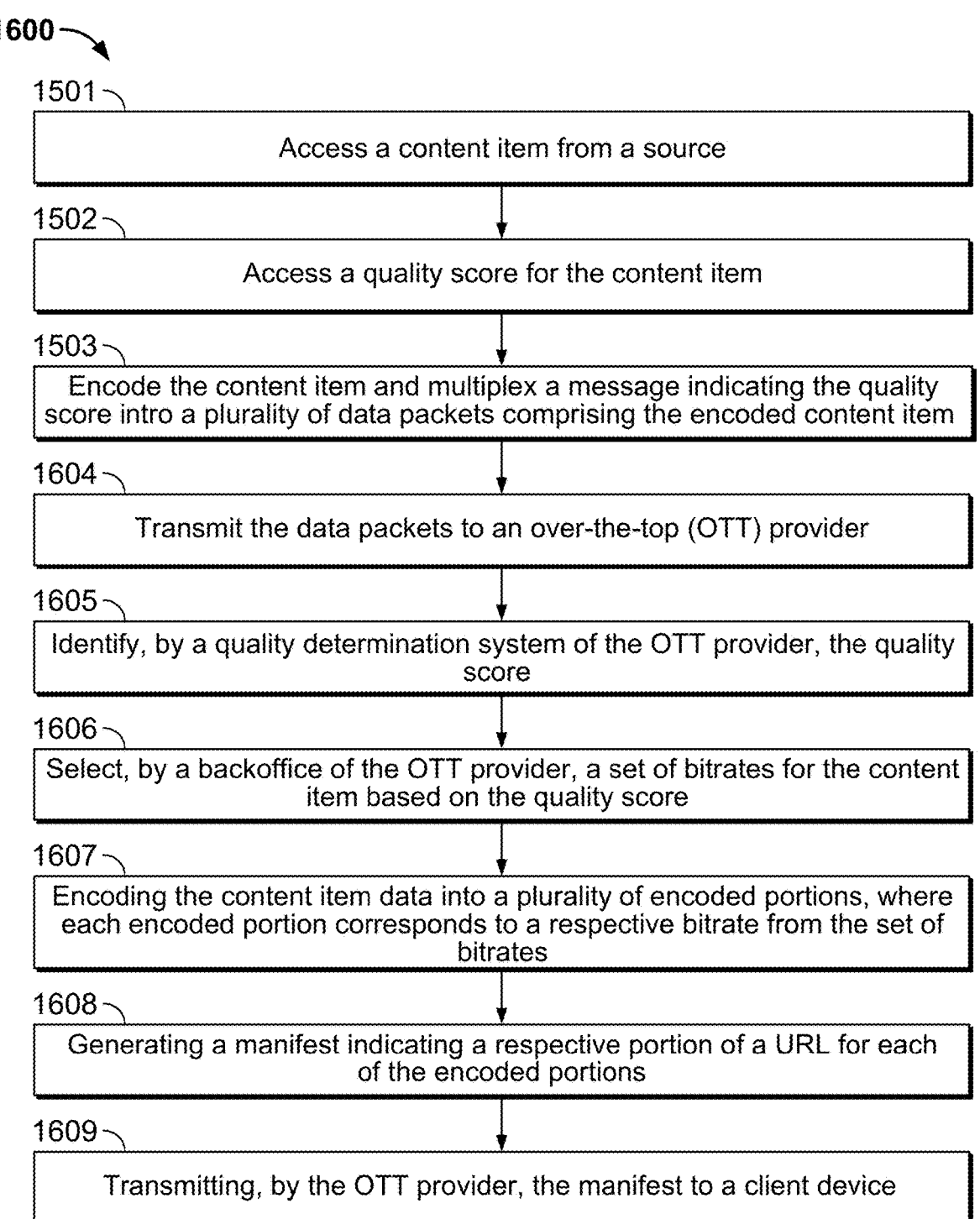

1600

1501 — Access a content item from a source

1502 — Access a quality score for the content item

1503 — Encode the content item and multiplex a message indicating the quality score intro a plurality of data packets comprising the encoded content item 1604 — Transmit the data packets to an over-the-top (OTT) provider 1605 — Identify, by a quality determination system of the OTT provider, the quality score 1606 — Select, by a backoffice of the OTT provider, a set of bitrates for the content item based on the quality score 1607 — Encoding the content item data into a plurality of encoded portions, where each encoded portion corresponds to a respective bitrate from the set of bitrates 1608 — Generating a manifest indicating a respective portion of a URL for each of the encoded portions 1609 — Transmitting, by the OTT provider, the manifest to a client device

FIG. 16

OPTIMIZING CONTENT ITEM COMPRESSION FOR ADAPTIVE BITRATE STREAMING BY OVER-THE-TOP (OTT) PROVIDERS

BACKGROUND

The present disclosure is directed towards systems and methods for optimizing content item compression for adaptive bitrate (ABR) streaming. Systems and methods are provided herein for detecting the quality of a content item and generating an ABR ladder which encodes the content item at a set of resolutions and bitrates which do not exceed the detected quality of the content item.

SUMMARY

There is an increasingly large amount of user generated content (UGC) on content item sharing and streaming services, e.g., YouTube™, TikTok™, etc. In one approach, the UGC content items will be re-encoded at multiple resolutions and quality levels for delivering to users under varying bandwidth conditions. The upload or source of such UGC is not always in high quality. Worse, the metadata of the uploaded UGC may not reflect the actual quality of the video (e.g., 280p video may be encoded as if it was 4K video). In such approaches, rate-distortion optimization (RDO) in content item compression may be challenged. When a low-quality source (especially if previously encoded with metadata reflective of high quality) is used as the reference for quality measurement, the encoder may allocate unnecessary bitrate or resolution of the content item. This unnecessary bitrate or resolution may preserve undesirable artifacts that came from the source or, in some instances, use more resources than are necessary while not improving the quality of the content item. For example, the 1080p version encoded at 5 Mbps provides a similar quality as the 720p encoded at 3 Mbps due to a limited low-quality source. Similar situations have been commonly observed in other content item streaming services including free ad-supported streaming TV (FAST). A channel may include content of varying quality and the inconsistency in content item quality from one program to another is quite usual.

For a low-quality content item, increasing resolution and bitrate does not actually increase the quality of the content item. In this case, the bitrate may see an upper bound if the source is blurred and is of low complexity, but the additional bitrate and resolution created in compression still consumes unnecessary computing resources. On the other hand, a good source content item provides better quality in a higher bitrate in the progression from lower bitrates. The quality of source content item may vary from segment to segment if the UGC was assembled from different sources. For example, a first time portion within a video may have been originally recorded in 360p while a second time portion of the video was recorded in a resolution of 4k, but they make up the same video. The source of UGC may be compressed prior to being uploaded to the content item sharing service, and there could even be multiple, cascaded content item encoding and scaling processes before the editing and upload of such UGC content item. It is highly desirable to UGC sites, such as Youtube, Facebook, and TikTok, to understand the limited quality of UGC upload and optimize the compression for ABR ladder for streaming. Additionally, it is desirable to an OTT provider or IPTV headend to understand the limited quality of a content item to optimize the compression for ABR ladder for streaming.

Systems and methods are provided for optimizing content item compression in ABR streaming. Systems and methods are disclosed herein to automatically assess the source content item quality of an uploaded content item and determine the highest operating point of each portion of the content item in resolution and bitrate. This quality assessment of the content item comprises an analysis of visual characteristics of at least one frame of the video, rather than analyzing the metadata for the video. For example, the system may determine that while the bitstream signaling or metadata indicates that a video is encoded in 4k, many nearby pixels are the same color, and the frame is encoded with macroblocking. In this example, the video may have originally been recorded in 360p, but transcoded in 4k. Therefore, the metadata is inaccurate. In this example, the portions originally encoded in 360p but now claiming to be encoded in 4k will use up resources, such as bandwidth, without any benefit to the end user. Then, the system will optimize content item compression by determining a ladder of bitrate-resolution pairs.

In some embodiments, a device uploads a video with a plurality of time portions. For each respective time portion, a quality score is accessed based on analysis of visual characteristics of at least one frame of the respective time portion. Different time portions may contain different quality scores. For example, a video may have been two separate videos originally which were recorded in different qualities. Those two videos of two different qualities were then edited together. The merged video may then claim to be encoded at the higher of the two qualities, while some time portions are at lower qualities and experience no increase in quality due to this encoding.

Based on the respective quality score, a respective ABR ladder with a respective set of bitrates is generated. Each time portion is encoded at each bit rates of the respective set of bitrates. The video is made available for streaming to a plurality of devices using each respective ABR ladder for each time portion of the video.

This allows the video to be made available at the maximum quality which the video content supports while minimizing resources used to deliver the content.

The ABR issues with inaccurate metadata impact over-the-top (OTT) and internet protocol television (IPTV) providers. IPTV providers are unaware of the actual quality of the content they serve and therefore automatically encode all content items at a multicast ABR (MABR) ladder. OTT providers also are unaware of the actual quality of the content they serve and therefore automatically provide all content items at quality levels beyond what the content actually supports. This uses up resources, such as bandwidth, streaming content which does not improve in quality based on this encoding. For example, an old TV program from 40 years ago may have a maximum resolution of 480p. However, OTT and IPTV providers will encode even these old programs at a set MABR bitrate ladder. For example, they may encode the program and make it available in 4k, 720p, 480p, 360p, and 240p. In this example, the versions of the program encoded in 4k and 720p will visually look identical to the version encoded in 480p, since that is the program's maximum operating point. These encodings will also use up resources of the provider's system.

In some embodiments, OTT service providers (like Hulu, YouTubeTV™, Fubo and Philo) and IPTV providers, such as AT&T, Verizon, and Sling TV, stream live TV broadcast channels and traditional cable channels to users over managed networksusing ABR streaming. Even though the ABR streaming is similar of on-demand streaming, there are challenges with Live streaming that are not needed for on-demand streaming. Some of these examples are very fast channel change (rendering content as fast as possible, synchronization to make all players play the content at the same time, decreasing latency so the OTT ABR players are as close to live as possible and providing manifest updates for the segments being continuously generated.

In some approaches, in the case of live streaming, a content item feed is received at the OTT live service providers' headend. This feed is fed into a live ABR encoder which the live profiles being statically set. An example may include 4K at multiple bitrate ladders, 1080p at multiple bitrate ladders, 720p at multiple bitrate ladders down to 480p and lower at multiple bitrate ladders. The encoders at the broadcaster's headend may be encoding this content at a set resolution even though the original source is not at that resolution.

In some implementations, the broadcaster may or may not encode the content at the original resolution and transmit the content over satellite to cable, internet protocol television (IPTV), affiliates and OTT live service providers. In the case of cable or IPTV providers, the encoders may be set up to always transcode the content from the incoming feed to a codec supported by the cable, IPTV or affiliate for transmission to the consumer. In the case of OTT providers, the content will be encoded based on the ABR encoding and packing profiles defined by the OTT service provider. In all cases, this can result in a waste of resources over the IPTV or cable system.

In some embodiments, cable systems deploy switched digital in which a cable system covers a channel lineup where the system cannot deliver all services over the system. The cable systems will offer the most popular channels all of the time and offer a switched tier of channels that are not as popular. When a subscriber tunes to a channel that is not switched, the set top box (STB) will simply tune to that channel by joining the frequency the channel is being transmitted on. In the case of a less popular channel, if another user is watching that channel, the channel change will result in the STB tuning to the frequency the channel is currently being broadcast on. If no user is watching the channel and if the system has enough resources to bring that channel/service up on the cable system, the STB will make a request to start transmitting the channel. The cable system will join the multicast live stream and bring that channel up and being transmitting on that frequency. The frequency is sent to the STB and the STB will receive the encoded stream, decode the stream and render the channel to the user.

For IPTV, multicast ABR (MABR) has been deployed for optimization of IPTV resources. Multicast ABR is a technology where a live service is fed into a live ABR encoder. The ABR encoder encodes the source content at multiple bitrates across multiple resolutions. Each of these bitrates are multicast over a UDP port. When an IPTV STB joins a stream, if there is ample bandwidth, the stream will be joined at the highest bitrate. If the delivery pipe is completely full, the multicast ABR system must adjust which streams are joined.

However, this system is inefficient since it allows for streams to be encoded which are at a resolution and bitrate which are above the actual quality of the original content. This increase in resolution and bitrate does not create any actual benefit in quality of the content item but uses up resources such as bandwidth. These resources could be much better managed if the quality of the source content is taken into account and the live MABR encoder bitrate ladders are dynamically adjusted based on the source. This addition has the opportunity to offer a significant improvement in IPTV MABR resource management including a better quality of experience (QoE) to the subscriber.

For OTT Live ABR, like MABR, the ABR encoders and packager is set up for static encoded and packaged bitrate ladders across different qualities regardless of the incoming source quality and metrics. The incoming source is received via a fixed line or satellite feed. The content is then transcoded and packaged based on a static ABR profile. The ABR encodings are fed into a packager and the segments and manifest is created based on that static definition. The segments are written out to the CDN origin alone with the manifest and manifest updates. The CDN distributes all of these qualities to the CDN nodes. In the early days, the distribution was cached based on caching of first pulled segments. Today, most CDNs multicast all live segments to the CDN edge nodes where the client device will be redirected by the CDN for pulling the live segments. With the generation of a quality that is based on the source quality for lower resolution source content will save CDN distribution resources, subscriber's bandwidth usage and also help subscribers who are with network operators that impose data caps.

Systems and methods are provided for optimizing content item compression in ABR streaming. Systems and methods are disclosed herein to automatically assess the source content item quality of an uploaded content item and determine the highest operating point of each portion of the content item in resolution and bitrate. Then, the system will optimize content item compression by determining a ladder of bitrates for the content source.

In some embodiments, a broadcaster accesses a content item from a source and a quality score of the content item. The broadcaster multiplexes a message indicating the quality score into a plurality of data packets that comprise at least a part of the broadcaster-encoded content item. The broadcaster transmits the data packets.

In some embodiments, broadcaster transmits the data packets to a headend. A quality determination system of the headend identifies the quality score based on the message multiplexed into the plurality of data packets. A backoffice of the headend then selects a set of bitrates for the content item based on the quality score. A transcoder of the headend transcodes content item data from the plurality of data packets into a plurality of streams, wherein each respective stream corresponds to a respective bitrate of the set of bitrates for the content item selected by the backoffice. The backoffice of the headend selects, by the backoffice of the headend, a plurality of network addresses, wherein each network address of the plurality of network addresses corresponds to a respective bitrate of the set of bitrates for the content item. A gapper of the headend inserts gaps into the streams and makes available each respective stream of the plurality of streams from a respective address of the plurality of addresses. The backoffice of the headend transmits the plurality of network addresses to a user gateway to enable the user gateway to provide streams from the plurality of addresses to a user internet protocol television (IPTV) device.

In some embodiments, broadcaster transmits the data packets to an OTT provider. A quality determination system of the OTT provider identifies the quality score based on the message multiplexed into the plurality of data packets. A backoffice of the OTT provider selects a set of bitrates for the content item based on the quality score. An ABR transcoder of the OTT provider encodes, for each respective bitrate of the set of bitrates, a respective plurality of encoded portions based on content item data from the plurality of data packets. The packager of the OTT provider generates a manifest indicating, for each encoded portion of each respective plurality of encoded portions, at least a respective encoded portion of a URL. The OTT provider transmits the manifest to the client device.

In this way, OTT and IPTV providers may make available a content item at the maximum quality which the content item supports while minimizing resources used to deliver the content.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which:

FIG. 14 shows a flowchart of illustrative steps involved in selecting an ABR ladder for a user uploaded content item, in accordance with some embodiments of the present disclosure;

FIG. 15 shows a flowchart of illustrative steps involved in an IPTV system selecting an ABR ladder for a content item, in accordance with some embodiments of the present disclosure; and FIG. 16 shows a flowchart of illustrative steps involved in an OTT system selecting an ABR ladder for a content item, in accordance with some embodiments of the present disclosure.

DETAILED DESCRIPTION

Figure 1:
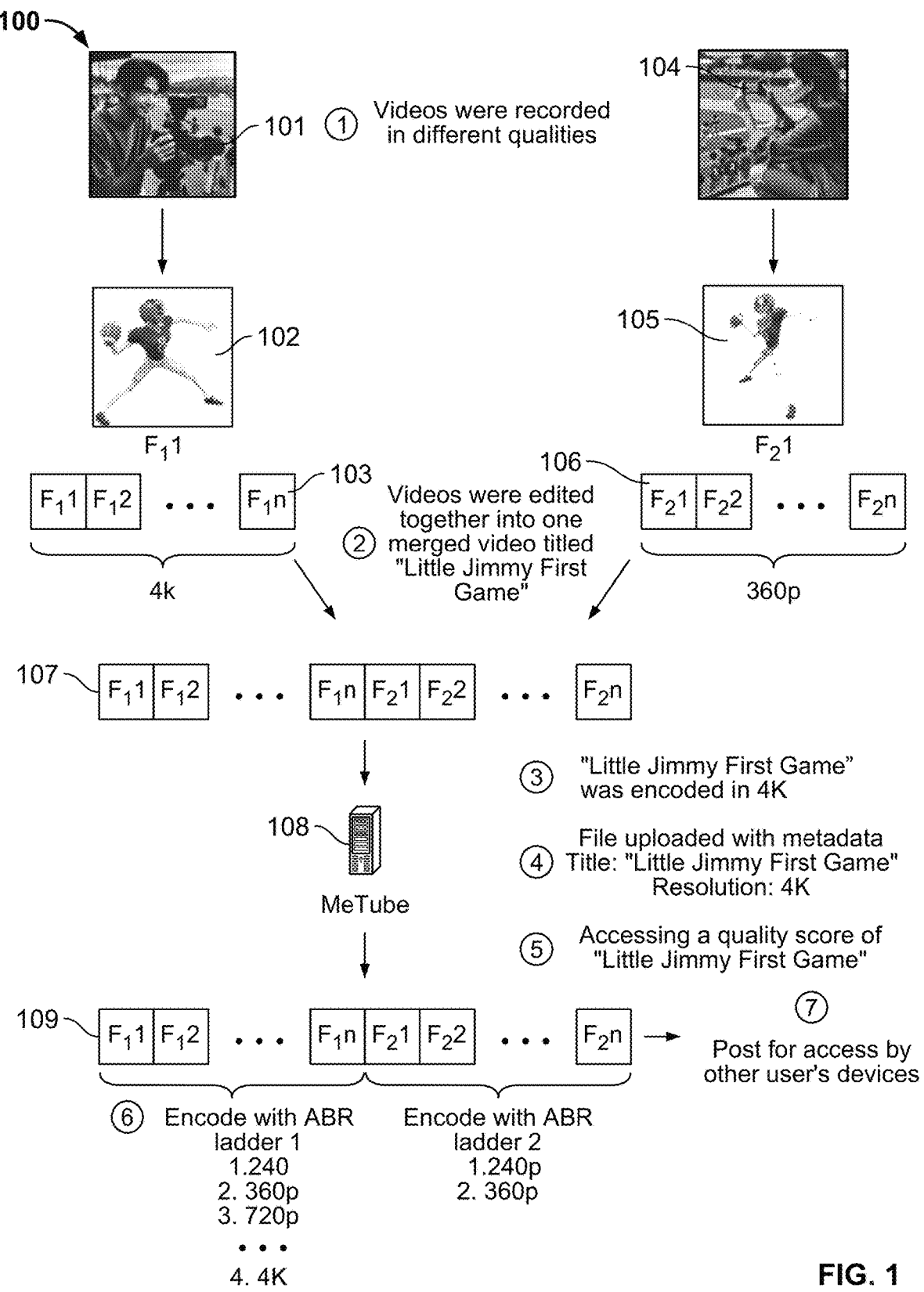
FIG. 1 shows a block diagram representing a system for optimizing content item compression for adaptive bitrate streaming, in accordance with some embodiments of the disclosure.

FIG. 1 shows a block diagram representing exemplary system 100 for optimizing content item compression for adaptive bitrate streaming, in accordance with some embodiments of the disclosure.

At step 1, two parents each record content items of their child's sports game. One parent records their content item on camera 101 which records in 4k. Camera 101 records content item F1 103 containing frame 102. The other parent records their content item on camera 104 which records in 360p. Camera 104 records content item F2 106 containing frame 105.

At step 2, content item F1 103 and content item F2 106 are then edited together into one merged content item 107 which is titled "Little Jimmy First Game." At step 3, merged content item 107, while containing some frames with a resolution of 4k and some frames with resolution of 360p, is encoded entirely in 4k. At step 4, merged content item 107 is uploaded to content item sharing service "MeTube" 108 with metadata indicating its title "Little Jimmy First Game" and resolution of 4k. At step 5, system 100 accesses a quality score of merged content item 107. In some implementations, the quality score indicates a picture quality, amount of blur, or amount of macroblocking of merged content item 107. This quality score is determined based on visual characteristics of content item 107, not based on metadata of merged content item 107. For example, the system may determine that while the metadata indicates that a video is encoded in 4k, many nearby pixels are the same color, and the frame is encoded with macroblocking. In this example, the video may have originally been recorded in 360p, but artificially encoded in 4k. Therefore, the metadata is inaccurate. In some implementations, the quality score indicates the bitrate of merged content item 107. System 100 thus determines that some of the frames of merged content item 107 have a resolution of 4k, since they were originally in content item 103, and some of the frames of merged content item 107 have a resolution of 360p, since they were originally in content item 106.

At step 6, system 100 encodes the portions of merged content item 107 which have a determined resolution of 4k using ABR ladder 1 and encodes the portions of merged content item 107 which have a determined resolution of 360p using ABR ladder 2 to generate MABR encoded merged content item 109. ABR ladder 1 comprises resolutions 240p, 360p, 720p, through 4k. ABR ladder 2 comprises resolutions 240p and 360p. ABR ladder 2 comprises less resolution levels than ABR ladder 1 because encoding those frames at a higher resolution results in no higher quality of a content item since the source is encoded at 360p. At step 7, encoded and merged content item 109 is posted for access by other users' devices using ABR ladder 1 and ABR ladder 2.

Without this system, merged content item 107 would be fully encoded in one ABR ladder which would go all the way up to 4k. Then, the portions of merged content item 107 which were originally recorded in 360p would also be encoded in, for example, 720p and 4k. This would use up resources such as bandwidth and network storage space while creating no increase in quality of the video for the end users.

In some embodiments, the time portions of merged content item which were originally recorded in different qualities may not be concatenated as F1 and then F2. For example, frames, time portions, or segments may be interleaved such that they are organized as F1 F2 F1 F2. In some embodiments, merged content item 107 may contained more than two merged videos.

Figure 2:
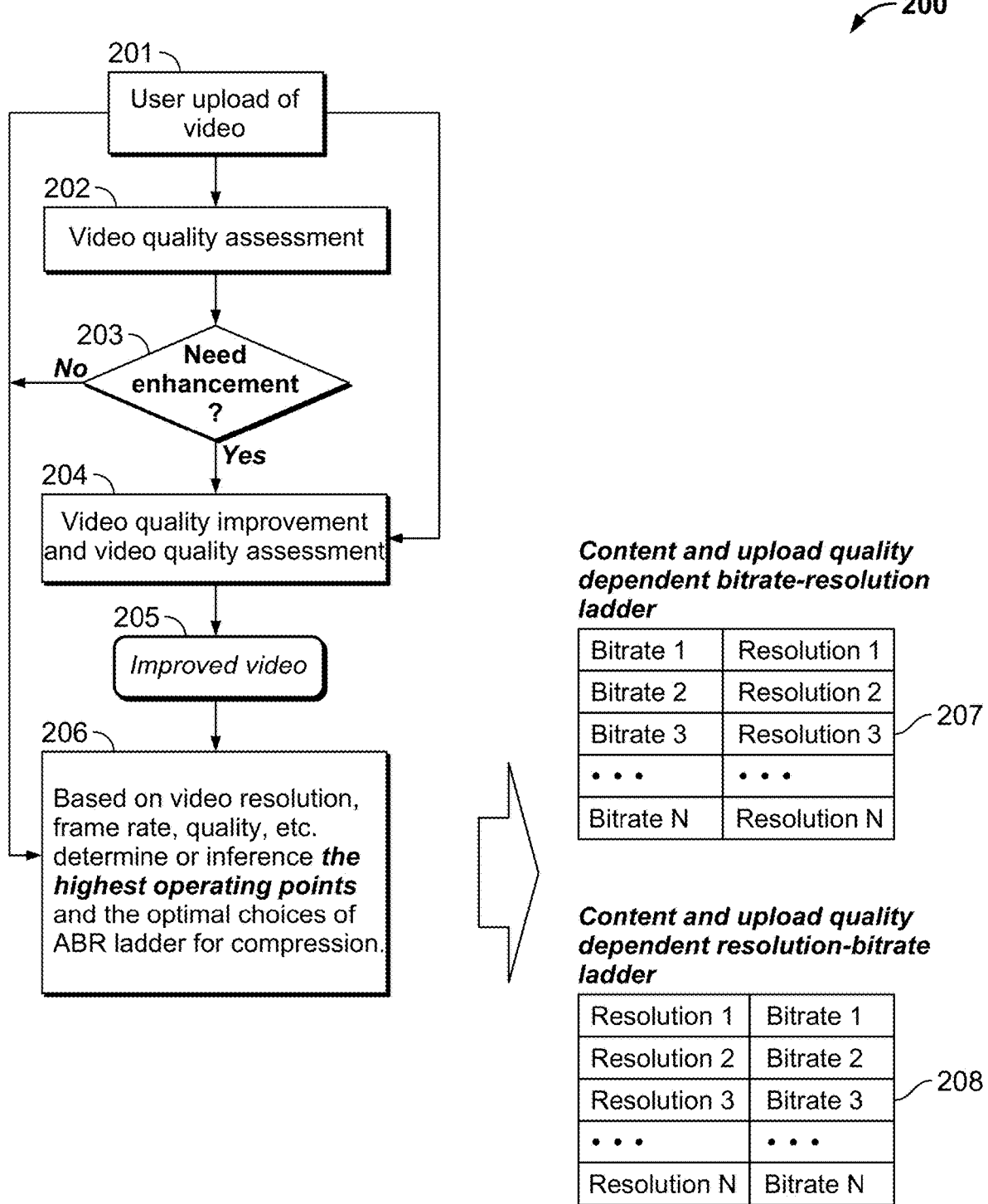
FIG. 2 shows a block diagram representing a process for optimizing content item compression for adaptive bitrate streaming which generates a bitrate-resolution ladder, in accordance with some embodiments of the disclosure.

FIG. 2 shows a block diagram representing process 200 for optimizing content item compression for adaptive bitrate streaming which generates a bitrate-resolution ladder, in accordance with some embodiments of the disclosure.

Process 200 determines an optimal ladder for optimizing content item compression, in accordance with some embodiments of this disclosure. The process 206 ensures a better viewing experience by optimizing content item content for various resolutions and bitrates. In some embodiments, algorithmic approaches analyze statistics of an uploaded content item and apply regression for optimized choices. For example, neural model-based approaches are established with a database including content items of varying quality for training. Also, for example, the database includes a variety of genres of training content as well as a comprehensive combination of bitrates and resolutions. Further, for example, inference through a trained model involves plugging the model into a transcoding procedure to create and optimize an ABR ladder for each content item or each segment.

In some embodiments, the process 200 includes content item quality assessment and improvement for user-generated content (UGC). In some embodiments, the USG may be merged content item 107 discussed in connection with FIG. 1. For example, the process 200 includes uploading 201 user-generated content. Also, for example, the process 200 includes assessing 202 content item quality. Further, for example, the process 200 optionally includes determining 203 whether enhancement is needed. Still further, for example, the process 200 includes based at least in part on determining enhancement is needed (203="Yes"), improving 204 content item quality and assessing content item quality. Moreover, for example, the process 200 includes providing 205 an improved content item. In addition, for example, the process 200 includes based at least in part on at least one of content item resolution, frame rate, quality, combinations of the same, or the like, determining or inferencing 206 one or more highest operating points and optimal choices of an ABR ladder for compression. Furthermore, for example, the process 200 includes based at least in part on determining enhancement is not needed (203="No"), performing the determining or inferencing 206. For example, the determining or inferencing 206 includes a content and upload quality dependent bitrate-resolution ladder 207 and/or a content and upload quality dependent resolution-bitrate ladder 208. Also, for example, the content and upload quality dependent bitrate-resolution ladder 207 assigns for any given bitrate-resolution pairs from 1 to N.

Further, for example, the content and upload quality dependent resolution-bitrate ladder 208 assigns for any given resolution 1 to N, a bitrate 1 to N, respectively. Content and upload quality dependent bitrate-resolution ladder 207 and/or a content and upload quality dependent resolution-bitrate ladder 208 may then be used to generate a manifest for viewing by a player on a user device. For example, the manifest may be generated using hypertext transfer protocol (HTTP) Live Streaming (HLS) and moving picture experts group dynamic adaptive streaming over HTTP (MPEG-DASH). A user may then switch between available bitrates on the bitrate-resolution ladder using addresses present in the manifest. In some embodiments, the manifest may be the manifest discussed in connection with FIG. 9.

Figure 3:
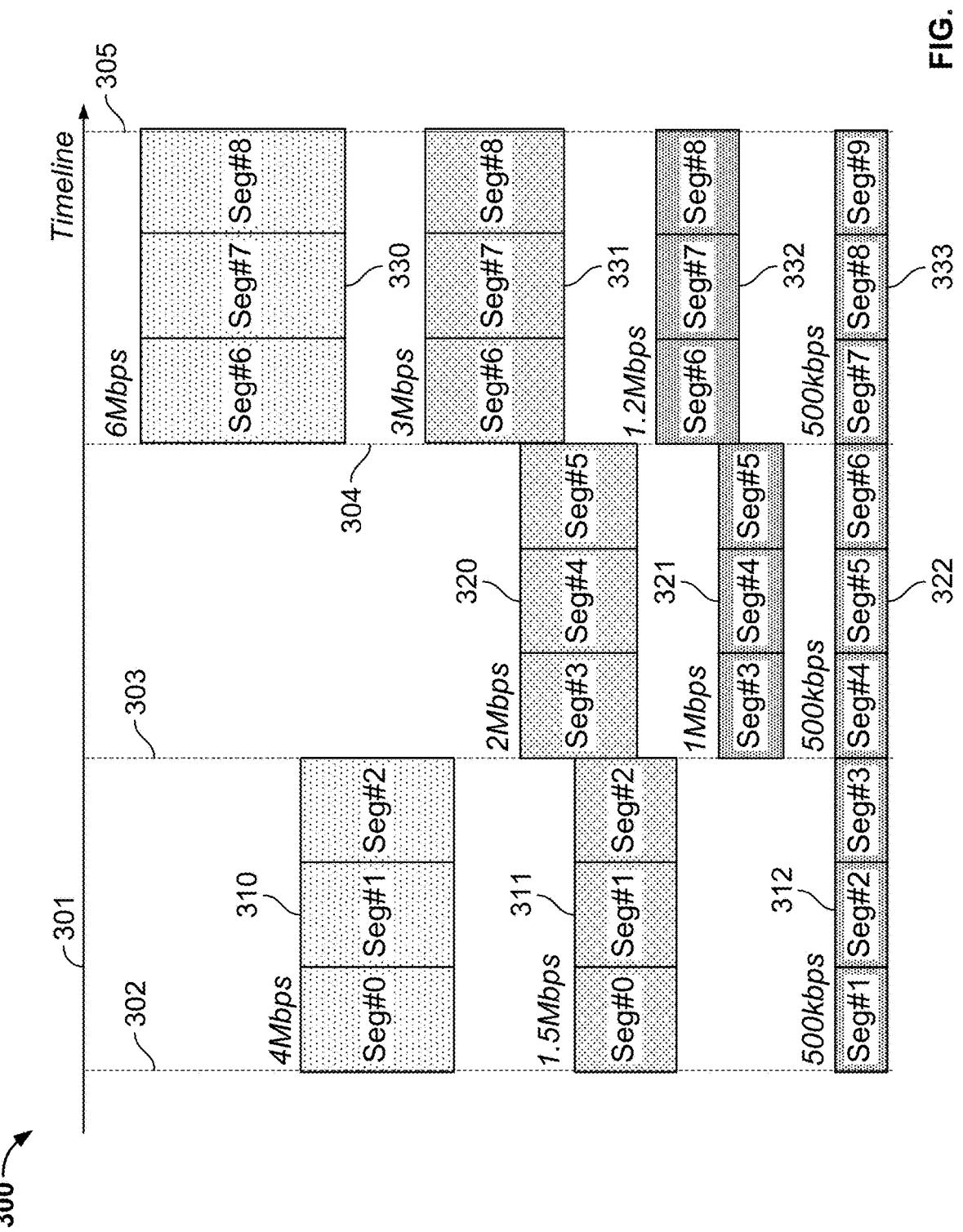
FIG. 3 shows a block diagram representing an example of a bitrate-resolution ladder, in accordance with some embodiments of the disclosure.

FIG. 3 shows a block diagram representing example 300 of a bitrate-resolution ladder, in accordance with some embodiments of the disclosure. In some embodiments, bitrate-resolution ladder 300 may be ABR ladder 1 or ABR ladder 2 discussed in connection with FIG. 1. In some embodiments, bitrate-resolution ladder 300 may be bitrate-resolution ladder 207 or bitrate-resolution ladder 208 discussed in connection with FIG. 2.

Example 300 shows a bitrate-resolution ladder for each time portion of a content item, where the time portions are of varying quality. The content item, which takes place along timeline 301, comprises a first time portion between time 302 and time 303, a second time portion between time 303 and time 304, and a third time portion between time 304 and time 305.

The time portion between time 302 and time 303 has a bitrate quality of 4 Mbps, so the first bitrate resolution ladder for time portion between time 302 and time 303 comprises step 310 at 4 Mbps, step 311 at 1.5 Mbps, and step 312 at 500 kbps. The time portion between time 303 and time 304 has a bitrate quality of 2 Mbps, so the second bitrate resolution ladder for time portion between time 303 and time 304 comprises step 320 at 2 Mbps, step 321 at 1 Mbps, and step 322 at 500 kbps. Since the time portion between time 303 and time 304 is of a lower quality, the higher qualities are not necessary to encode. The time portion between time 304 and time 305 has a bitrate quality of 6 Mbps, so the third bitrate resolution ladder for time portion between time 304 and time 305 comprises step 330 at 6 Mbps, step 331 at 3 Mbps, step 332 at 1.2 Mbps, and step 333 at 500 kbps.

Figure 4:
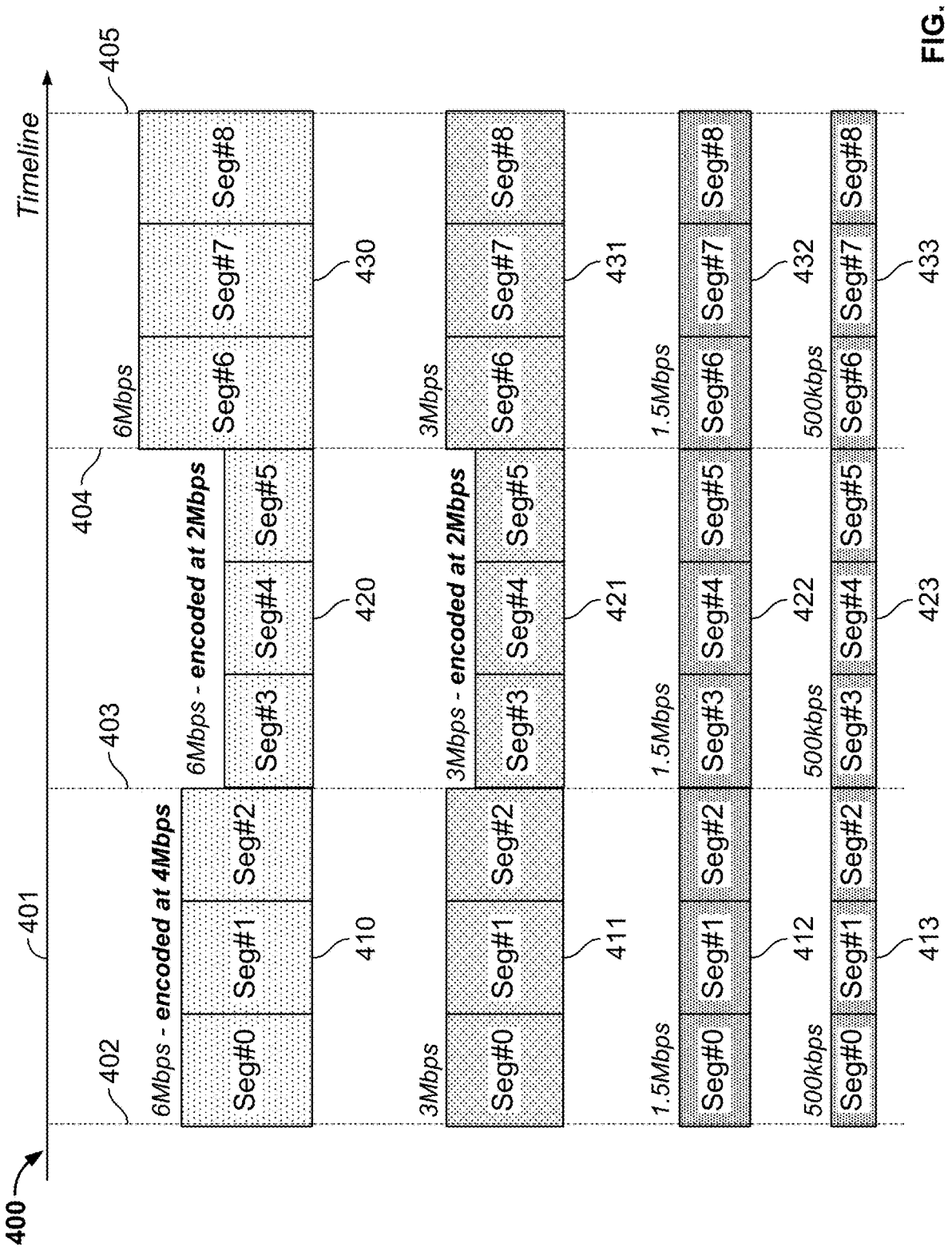
FIG. 4 shows a block diagram representing an example of a bitrate-resolution ladder, in accordance with some embodiments of the disclosure.

FIG. 4 shows a block diagram representing example 400 of a bitrate-resolution ladder, in accordance with some embodiments of the disclosure. In some embodiments, bitrate-resolution ladder 400 may be ABR ladder 1 or ABR ladder 2 discussed in connection with FIG. 1. In some embodiments, bitrate-resolution ladder 300 may be bitrate-resolution ladder 207 or bitrate-resolution ladder 208 discussed in connection with FIG. 2.

Example 400 shows a bitrate-resolution ladder for each time portion of a content item, where the time portions are of varying quality. The content item, which takes place along timeline 401, comprises a first time portion between time 402 and time 403, a second time portion between time 403 and time 404, and a third time portion between time 404 and time 405.

In this example, the time portion between time 403 and time 404 has a lower bitrate quality than the time portion between time 402 and time 403 and the time portion between time 404 and time 405. The time portion between time 403 and time 404 has a bitrate quality of 2 Mbps. However, it can be encapsulated as 6 Mbps. The time portion between time 402 and time 403 has a bitrate quality of 4 Mbps. However, it can also be encapsulated as 6 Mbps Thus, this encoding is inefficient and the actual bitstream could be encoded at a lower bitrate without compromising content item quality in order to save bandwidth.

Figure 5:
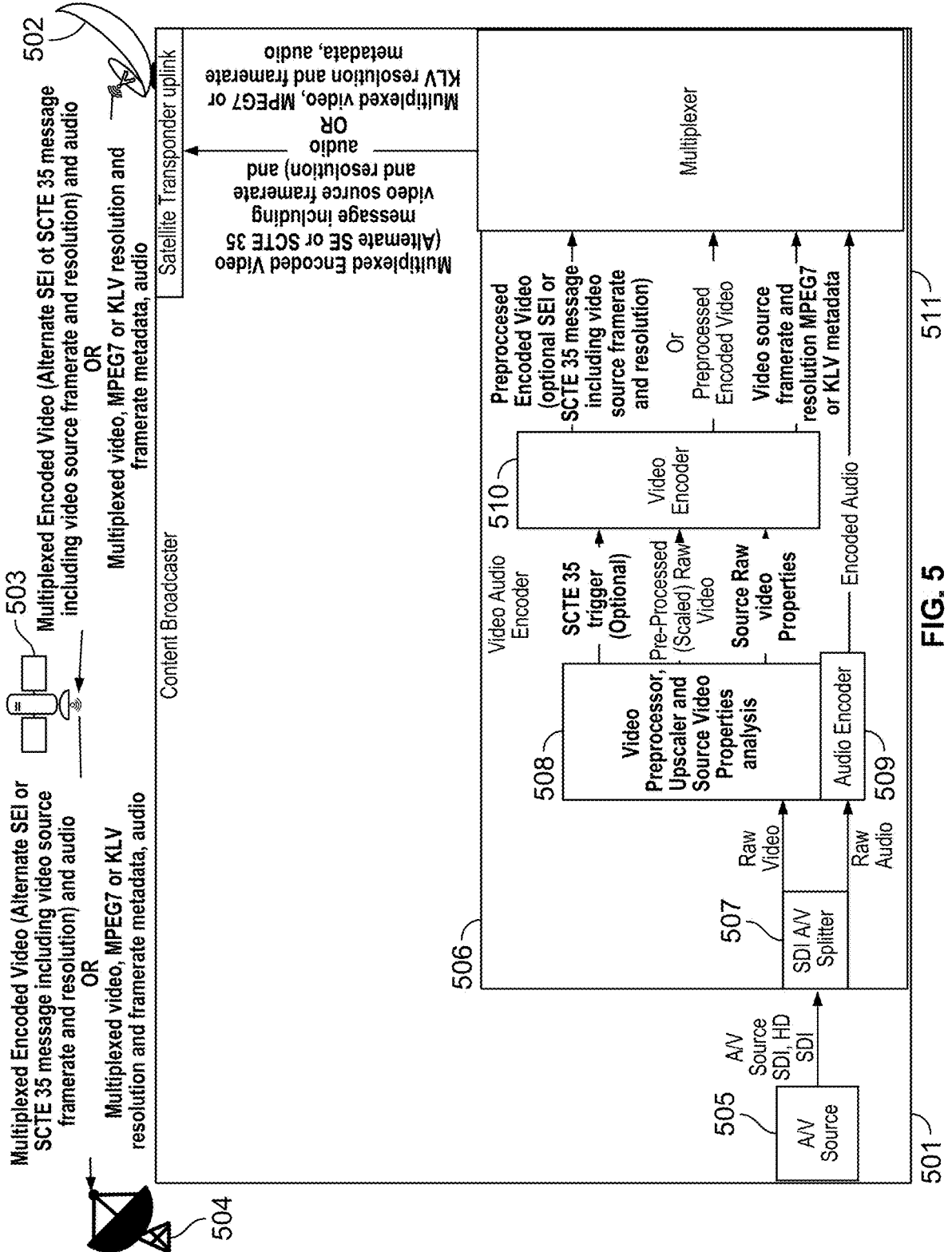
FIG. 5 shows a block diagram representing a broadcaster which transmits a source content item stream with a message indicating the quality of the content item, in accordance with some embodiments of the disclosure.

FIG. 5 shows a system 500 representing a broadcaster 501 which transmits a source content item stream with a message indicating the quality of the content item, in accordance with some embodiments of the disclosure. System 500 uses a satellite broadcast system for sending the broadcast feed to the cable, IPTV, or OTT headend. In some embodiments, broadcaster 501 may be broadcaster server 1304 discussed in connection with FIG. 13.

In some embodiments, a content item is sent from an original source to broadcaster 501, which stores the content item at audio/visual (A/V) source 505. Audio/visual (A/V) source 505 transmits the content item data to serial digital interface (SDI) A/V splitter 507. In some embodiments, this transmission may occur using SDI/high-definition (HD) SDI. SDI A/V splitter 507 splits the content item into raw content item data and audio data. The audio data is transmitted to audio encoder 509, which in turn transmits the encoded audio to multiplexer 511. The content item data is transmitted to content item preprocessor 508. In some embodiments, content item preprocessor 508 will upscale the content item data. In some embodiments, content item preprocessor 508 will analyze the properties of the content item. Content item preprocessor 508 will transmit the preprocessed raw content item and its properties to content item encoder 510. In some embodiments, content item preprocessor 508 will transmit the properties of the content item via a supplemental enhancement information (SEI) message. In some embodiments, content item preprocessor 508 will transmit the properties of the content item via a Society of Cable Telecommunications Engineers standard (SCTE) 35 ad insertion message. Content item encoder 520 will upscale, downscale the resolution or perform frame doubling or drop frames depending on the configured framerate or keep the content item the same resolution and framerate if it matches the encoder configuration. Content item encoder 510 then transmits the preprocessed encoded content item to multiplexer 511.

In some embodiments, content item encoder 510 may also transmit a message indicating the properties of the content item. This message will allow the cable, IPTV, or OTT provider's equipment to know the source content's resolution. In some embodiments, the message may be an SCTE 35 ad insertion message, which is modified to include content item source framerate and resolution. In some embodiments, the message may be a moving picture experts group (MPEG-7) or metadata which indicates the quality score the source content item which is multiplexed into the stream along with audio and content item by multiplexer 511.

In some embodiments, multiplexer 511 transmits a multiplexed encoded content item via a plurality of data packets and a message indicating a quality score of the content item to satellite transponder uplink 502. In some embodiments, the multiplexed encoded content item data packets will contain a multiplexed SEI or SCTE 35 message which includes the content item source framerate and resolution. In some embodiments, the multiplexed encoded content item will contain a multiplexed MPEG 7 message or other resolution and framerate metadata message. Transponder uplink 502 transmits the multiplexed encoded content item and message to satellite 503, which in turn transmits the multiplexed encoded content item and message to satellite transponder downlink 504. Satellite transponder downlink 504 may be any of a cable, IPTV, or OTT headend.

While the methods of FIG. 5 have been described as having been implemented by various hardware, it is seen that these methods could equally be implemented by an ABR application. For example, these methods may be implemented by media application discussed in connection with FIG. 12.

Figure 6:
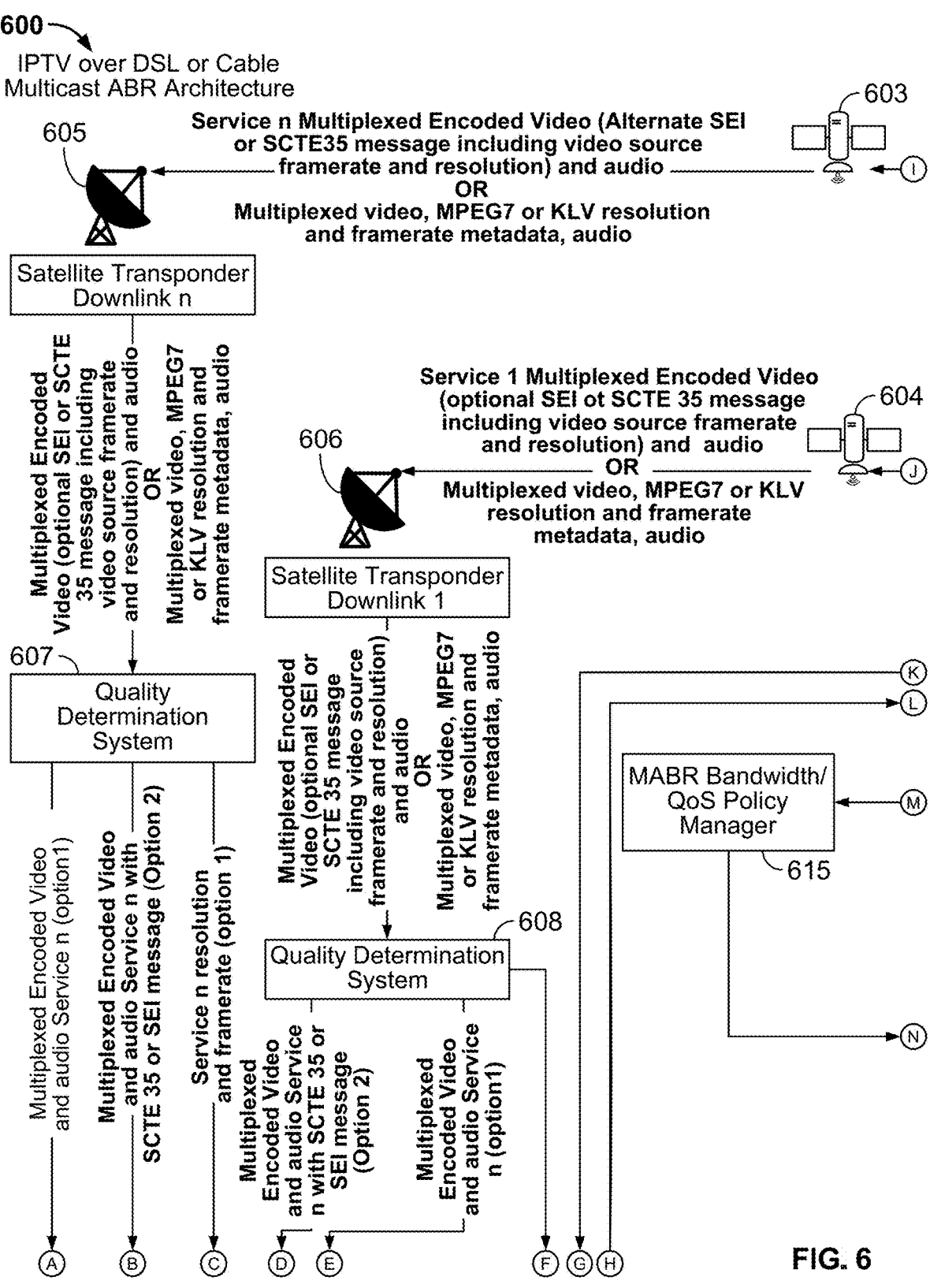
FIG. 6 shows a block diagram representing an internet protocol television (IPTV) multicast ABR (MABR) system where the MABR ladders are adjusted based on the source content item's resolution and bitrate, in accordance with some embodiments of the disclosure.

FIG. 6 shows a block diagram representing internet protocol television (IPTV) multicast ABR (MABR) system 600 where the MABR ladders are adjusted based on the source content item's resolution and bitrate, in accordance with some embodiments of the disclosure. In some embodiments, system 600 may be server 1315 discussed in connection with FIG. 13.

IPTV providers are unaware of the actual quality of the content they serve and therefore automatically encode all content items at a set MABR ladder. This uses up resources, such as bandwidth, streaming content which does not improve in quality based on this encoding. For example, an old TV program from 40 years ago may have a maximum resolution of 480p. However, IPTV providers will encode even these old programs at a set MABR bitrate ladder. For example, they may encode the program and make it available in 4k, 720p, 480p, 360p, and 240p. In this example, the versions of the program encoded in 4k and 720p will visually look identical to the version encoded in 480p, since that is the program's maximum operating point. These encodings will also use up network resources of the IPTV provider's managed video delivery system. Therefore, a system is needed to include a message containing a quality metric indicative of the actual quality of the content item rather than the quality indicated by the metadata of the content item with the multiplexed data packets sent from the broadcaster to the IPTV provider.

Satellite transponder uplink 601 and satellite transponder uplink 602 each correspond to a content broadcaster service. Each content broadcaster service operates such as broadcaster 501 discussed in connection with FIG. 5. Each of satellite 603 and satellite 604 operates such as satellite 503 discussed in connection with FIG. 5. Each of satellite transponder downlink 605 and of satellite transponder downlink 606 operate such as satellite transponder downlink 504.

In some embodiments, satellite transponder downlink 605 receives a multiplexed plurality of data packets containing the data of the encoded content item with a message indicating a quality score of the content item. In some implementations, the quality score may indicate the framerate and resolution of the content item. Satellite transponder downlink 605 transmits the multiplexed data packets with the message indicating the quality score of the content item to quality determination system 607. Quality determination system 607 determines, based on the message, the quality score of the content item. In some embodiments, the quality determination system may demultiplex the data packets of the content item in order to obtain the message indicating the quality score. In some embodiments, the quality score is multiplexed into the MP2TS via MPEG7 or KLV data packets as MPEG7 or KLV metadata. In these embodiments, quality determination system 607 demultiplexes the stream to extract the MPEG7 or KLV metadata which indicates the quality score. Quality determination system 607 then transmits the quality score to segmentation/gapper 611.

In some embodiments, segmentation/gapper streamer 611 forwards the quality score to MABR backoffice 613. Quality determination system 607 then remultiplexes the data packets and transmits the remultiplexed encoded content item to live MABR transcoder 609. In some embodiments, the quality score is multiplied into MPEG-2 transport stream (MP2TS) data packets as an SEI or SCTE 35 message. In these embodiments, the MP2TS multiplexed stream is sent directly to MABR transcoder 609. The MABR transcoder demultiplexes the video and audio and sends the resolution and framerate embedded in the SEI or SCTE 36 message to segmentation/gapper 611. Segmentation/gapper 611 will forward the quality score to MABR backoffice 613.

In some embodiments, MABR backoffice 613 will then lookup the ABR encoding profile based on the received quality score. MABR backoffice 613 will send the transcoding profile to MABR transcoder 609 for that service/channel. MABR backoffice 613 will begin encoding the ABR ladders at the bitrates, resolutions, and framerates on their respective multicast address ports. At the same time, MABR backoffice 613 will send Segmentation/Gapper 611 the service multicast addresses for each of the gapped multicast streams to deliver to client devices, such as gateway or cable modem 619 and IPTV set-top-boxes (STB) 620. MABR backoffice 613 will send the new gapped service multicast addresses and their respective bitrates for the service to gateways or cable modem 619 allowing for the bandwidth management algorithm to properly adjust based on the new bitrates and multicast addresses for that service.

In some embodiments, segmenter/gapper 611 is configured to receive the plurality of encoded MABR streams for each service channel from MABR transcoder 610. Segmenter/gapper 612 is operative to generate a segmented and gapped MABR stream for each encoded MABR stream of each service channel, with an inter-segment gap ranging from a few tens of milliseconds to a few hundreds of milliseconds in one example implementation. A channel change processing element is coupled to MABR transcoder 610 to receive the plurality of encoded MABR streams and is configured to generate and store recovery segments in a cache for each bitrate representation of each service channel, wherein each recovery segment corresponds to a segment of the particular bitrate representation of each service channel being multicast.

In some embodiments, segmentation/Gapper 611 transmits the gapped streams to router 616, which transmits them to digital subscriber line access multiplexer (DSLAM) or cable modem termination system (CMTS) 617. Digital subscriber line (DSL) or data over sable service interface specification (DOCSIS) 618 transmits the stream to the home at the gateway or cable modem 619. Gateway or cable modem 619 routes the streams to various IPTV STBs 620.

In some embodiments, satellite transponder downlink 606 receives a multiplexed plurality of data packets containing the data of the encoded content item with a message indicating a quality score of the content item. In some implementations, the quality score may indicate the framerate and resolution of the content item. Satellite transponder downlink 606 transmits the multiplexed data packets with the message indicating the quality score of the content item to quality determination system 608. Quality determination system 608 determines, based on the message, the quality score of the content item. In some embodiments, the quality determination system may demultiplex the data packets of the content item in order to obtain the message indicating the quality score. In some embodiments, the quality score is multiplied into the MP2TC via MPEG7 or KLV data packets as MPEG7 or KLV metadata. In these embodiments, quality determination system 608 demultiplexes the stream to extract the MPEG7 or KLV metadata which indicates the quality score. Quality determination system 608 then transmits the quality score to segmentation/gapper streamer 612. Segmentation/gapper streamer 612 forwards the quality score to MABR backoffice 614. Quality determination system 608 then remultiplexes the data packets and transmits the remultiplexed encoded content item to live MABR transcoder 610. In some embodiments, the quality score is multiplexed into MP2TS data packets as an SEI or SCTE 35 message. In these embodiments, the MP2TS multiplexed stream is sent directly to MABR transcoder 610. The MABR transcoder demultiplexes the video and audio and sends the resolution and framerate embedded in the SEI or SCTE 36 message to segmentation/gapper 612. Segmentation/gapper 612 will forward the quality score to MABR backoffice 614.

In some embodiments, MABR backoffice 614 will then lookup the ABR encoding profile based on the received quality score. MABR backoffice 614 will send the transcoding profile to MABR transcoder 610 for that service/channel. MABR backoffice 614 will begin encoding the ABR ladders at the bitrates, resolutions and framerates on their respective multicast address ports. At the same time, MABR backoffice 614 will send segmentation/gapper 612 the service multicast addresses for each of the gapped multicast streams to deliver to client devices, such as gateway or cable modem 619 and IPTV set-top-boxes (STB) 620. MABR backoffice 613 will send the new gapped service multicast addresses and their respective bitrates for the service to gateways or cable modem 619 allowing for the bandwidth management algorithm to properly adjust based on the new bitrates and multicast addresses for that service. Segmentation/Gapper 612 transmits the gapped streams to router 616, which transmits them to digital subscriber line access multiplexer (DSLAM) or cable modem termination system (CMTS) 617. Digital subscriber line (DSL) or data over sable service interface specification (DOCSIS) 618 transmits the stream to the home at the gateway or cable modem 619. Gateway or cable modem 619 routes the streams to various IPTV STBs 620.

When a user at one of the IPTV STBs 620 wishes to switch from one stream to another, gapper/segmenter 611 and gapper/segmenter 612 allow for switching without interruptions of service ABR Video management agent 621 receives the multiple gapped streams. When a user leaves one stream using an internet group management protocol (IGMP), it can join another without interruptions to IPTV STB 620. Gateway or cable modem 619 operates such as ABR Video management agent 621.

While the methods of FIG. 6 have been described as having been implemented by various hardware, it is seen that these methods could equally be implemented by an ABR application. For example, these methods may be implemented by media application discussed in connection with FIG. 12.

Figure 7:
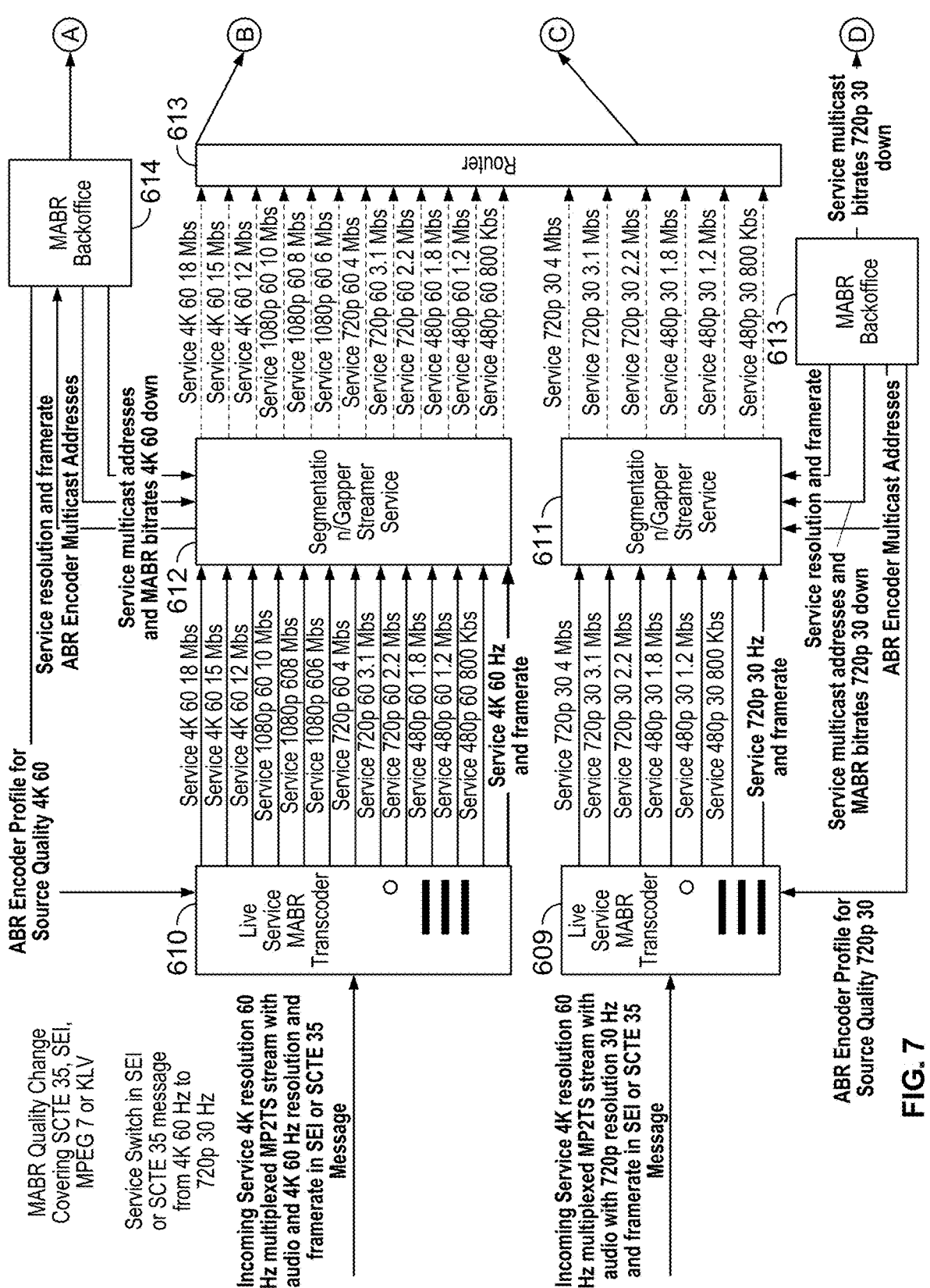
FIG. 7 shows a block diagram representing an example of an IPTV system receiving a quality change, in accordance with some embodiments of the disclosure.
Figure 7:
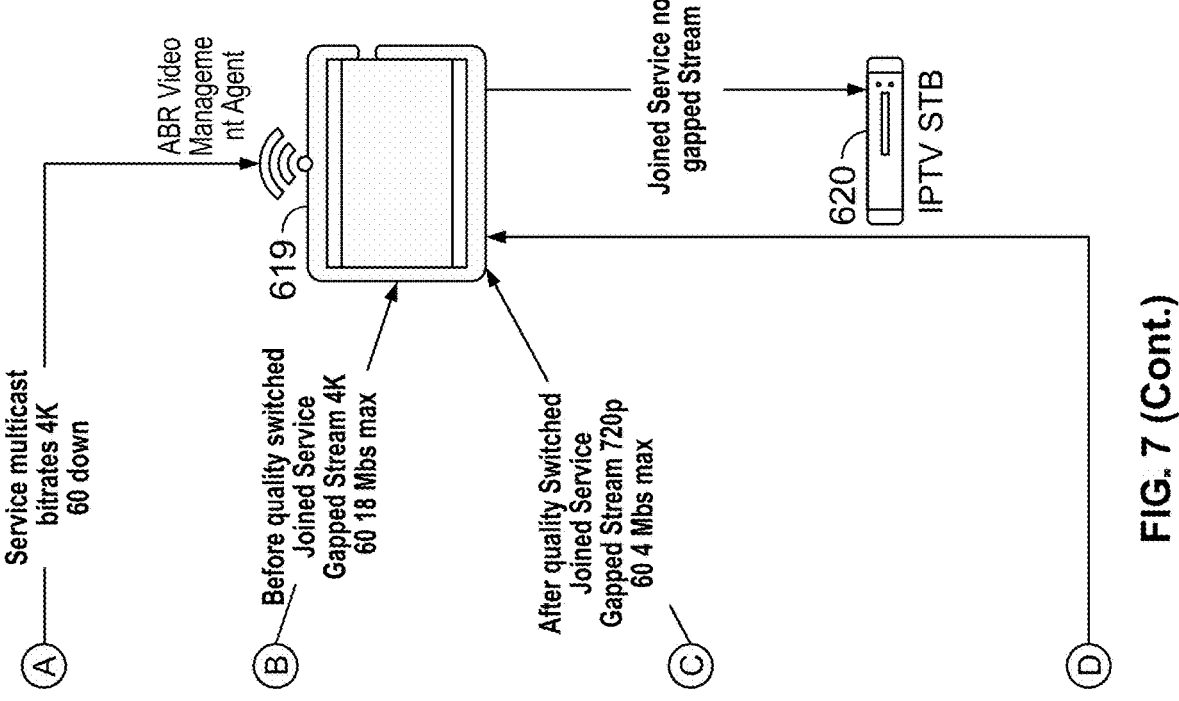

FIG. 7 shows a block diagram representing an example 700 of an IPTV system receiving a quality change when the quality score is multiplexed using an SEI or SCTE 35 message, in accordance with some embodiments of the disclosure.

The incoming service at MABR transcoder is 4K 60 Hz and the SCTE 35 or SEI message indicates the quality score of the content item is 4K 60 Hz. Live Service ABR transcoder 610 reads and extracts 4K resolution and 60 Hz framerate from the SCTE 35 or SEI message and passes that to Segmentation/Gapper 612. Segmentation/Gapper 612 sends the Service 4K resolution and 60 Hz framerate to MABR back office 614. MABR back office 614 looks up the ABR transcoding profile for a max quality for 4K 60 Hz. MABR Backoffice 614 sends the ABR encoding profile to the MABR transcoder along with the multicast addresses for each MABR bitrate. At the same time, MABR back office 614 sends segmentation/gapper 612 the multicast addresses for each quality to receive the ABR transcoded streams from MABR transcoder 610. The MABR transcoder begins multicasting the qualities on their corresponding UDP address port. Segmentation/gapper 612 joins the multicast addresses for each quality from the MABR transcoder 610. MABR back office 614 sends segmentation/gapper 612 the multicast addresses for each gapped quality. Segmentation/gapper 612 begins multicasting the gapped segment qualities on their corresponding address port. MABR back office 614 sends each gateway/cable modem the new MABR profile containing the multicast addresses for each of the bitrate qualities. In some embodiments, this gateway/cable modem may be gateway/cable modem 619 discussed in connection with FIG. 6. This allows the bandwidth management system to properly control which qualities are joined based on the policy. While the stream is being received, a program ends and a new program begins on the same live service.

MABR transcoder 609 represents the same system of MABR transcoder 610 in the situation where the user changes the program or stream. The incoming stream is still 4K at 60 Hz however the SEI or SCTE 35 message indicates a change in resolution to 720p and a framerate of 30 Hz. Live Service ABR transcoder 609 reads and extracts 720p resolution and 30 Hz framerate from the SCTE 35 or SEI message and passes that to Segmentation/Gapper 611. Segmentation/Gapper 611 sends the service 720p resolution and 30 Hz framerate to MABR back office 613. MABR back office 613 looks up the ABR transcoding profile for a max quality for 720p 30 Hz. The system then works as with the system in connection with MABR transcoder 610.

While the methods of FIG. 7 have been described as having been implemented by various hardware, it is seen that these methods could equally be implemented by an ABR application. For example, these methods may be implemented by media application discussed in connection with FIG. 12.

Figure 8:
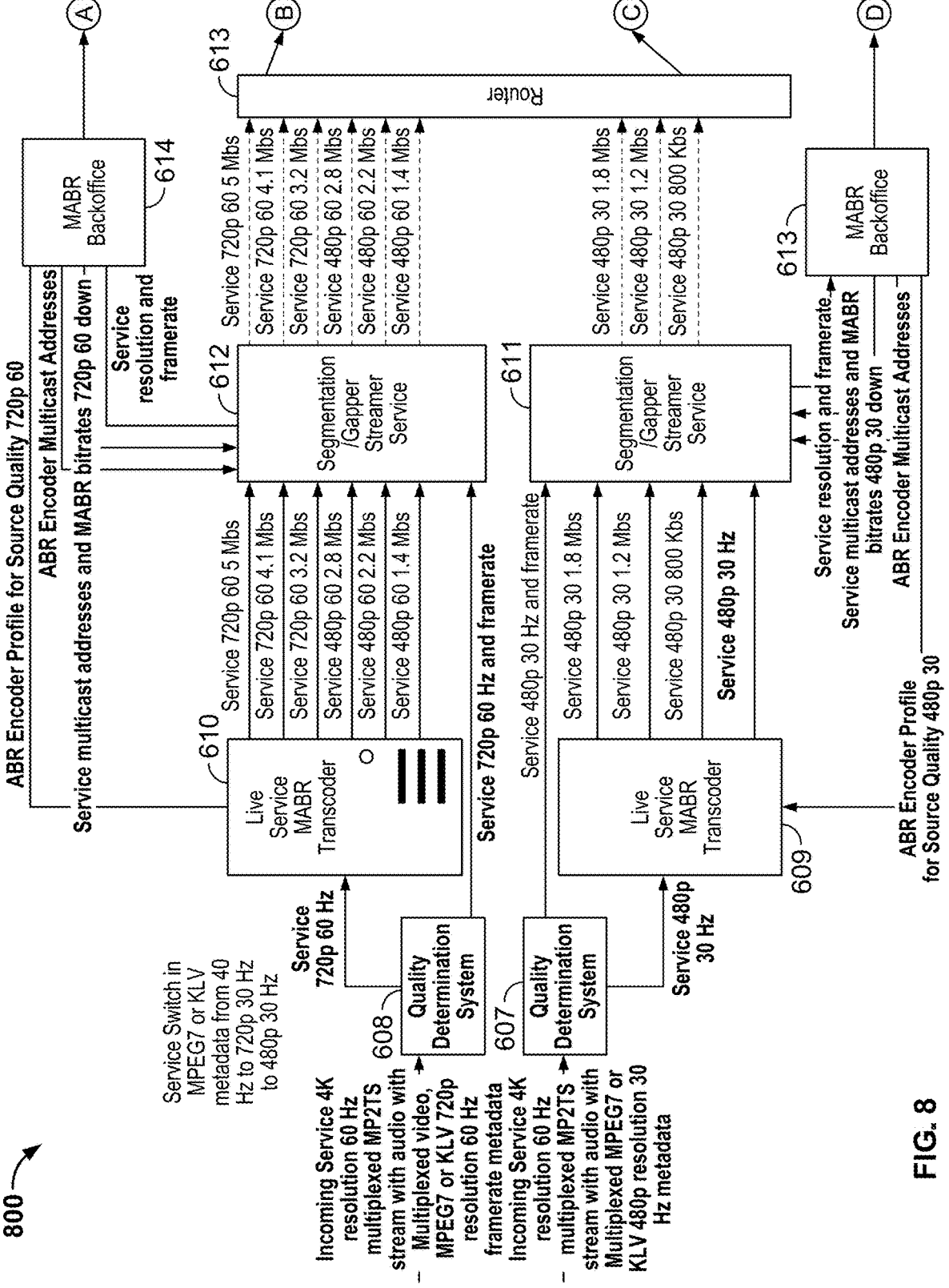
FIG. 8 shows a block diagram representing an example of an IPTV system receiving a quality change, in accordance with some embodiments of the disclosure.
Figure 8:
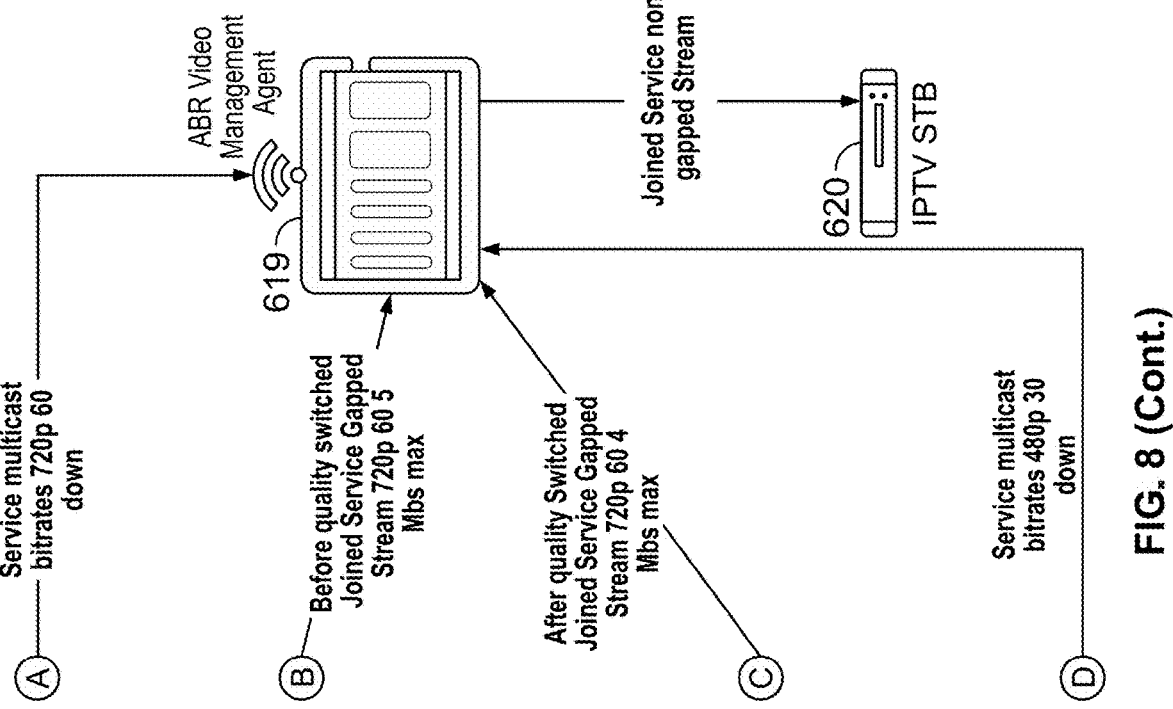

FIG. 8 shows a block diagram representing an example 800 of an IPTV system receiving a quality change when the quality score is multiplexed using MPEG7 or KLV metadata, in accordance with some embodiments of the disclosure.

Incoming service at MABR transcoder 610 is 4K 60 Hz and the included multiplexed MPEG7 or KLV metadata indicates the quality score of the content item is 720P 60 Hz. Quality determination system 608 will demultiplex the content to extract and parse the MPEG7 or KLV metadata to retrieve the quality score. The video, audio and any other stream will be multiplexed and sent to MABR transcoder 610. Quality determination system 608 will send the 720P resolution and 60 Hz source framerate to Segmentation/Gapper 612. Segmentation/Gapper 612 will send the quality score to MABR back office 614. MABR back office 614 will look up and retrieve the MABR encoding profile for 720P 60 Hz. MABR backoffice 614 will send the ABR encoder profile for source quality 720p 60 Hz along with the multicast address port for each quality. MABR Backoffice 614 will send Segmentation/Gapper 612 the MABR encoder multicast address port for each bitrate, resolution and framerate. MABR back office 614 will send the service multicast address port for each of the MABR bitrates from 720P 60 Hz and down. The methods will apply as discussed in connection with FIG. 7 for adjusting the bandwidth management and advertising the new multicast addresses ports.

At MABR transcoder 609, the MPEG7 or KLV metadata contained within the 4K 60p stream has the content source resolution at 480p at 30 Hz at an ad insertion point or a program change. The same process is repeated as in connection with the system of transcoder 610 adjusting to the new resolution of 480p and framerate of 30 Hz.

While the methods of FIG. 8 have been described as having been implemented by various hardware, it is seen that these methods could equally be implemented by an ABR application. For example, these methods may be implemented by media application discussed in connection with FIG. 12.

Figure 9:
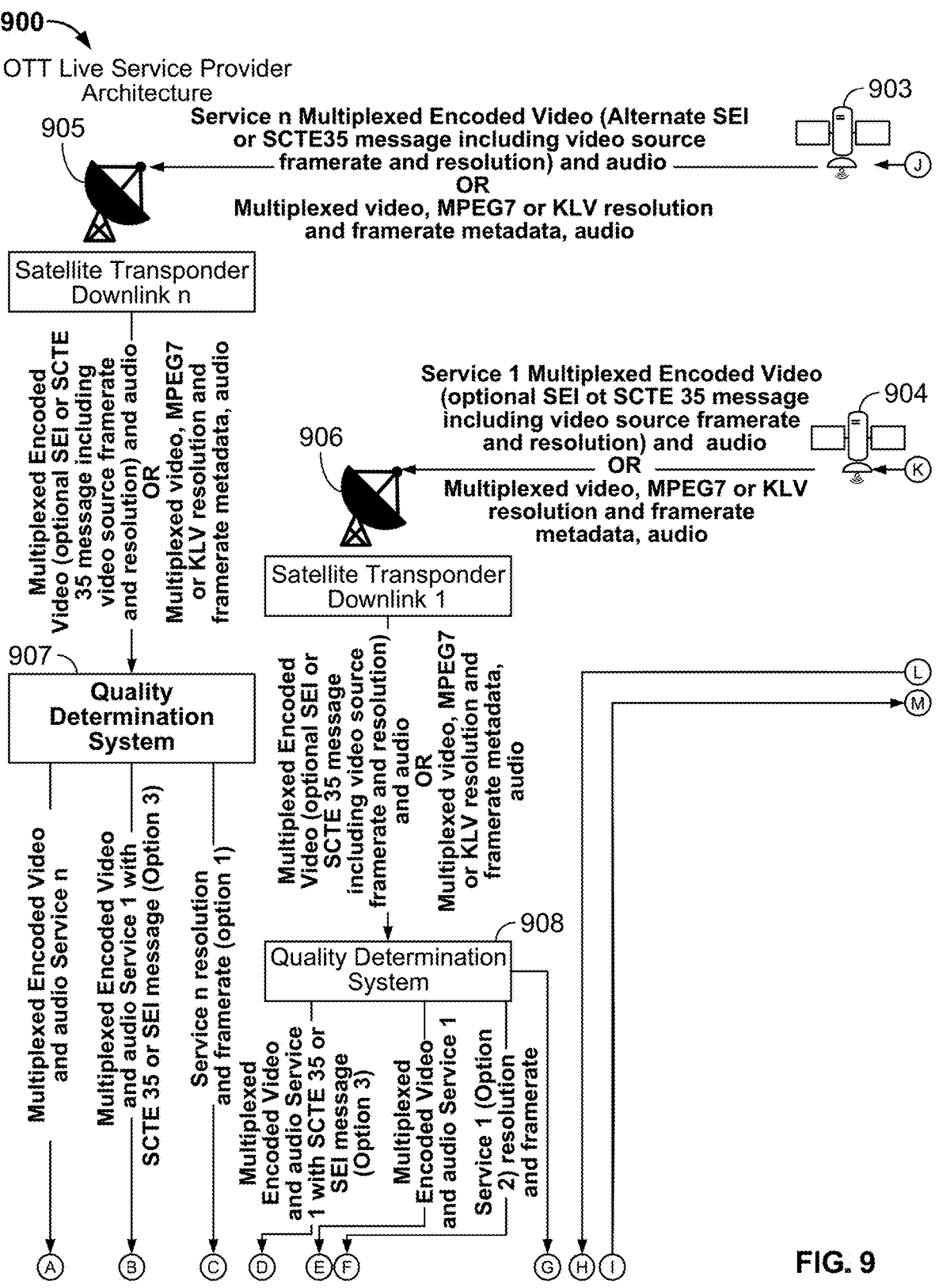
FIG. 9 shows a block diagram representing an over-the-top (OTT) multicast ABR (MABR) system where the MABR ladders are adjusted based on the source content item's resolution and bitrate, in accordance with some embodiments of the disclosure.

FIG. 9 shows a block diagram representing an over-the-top (OTT) ABR system where the ABR ladders are adjusted based on the source content item's resolution and bitrate, in accordance with some embodiments of the disclosure. In some embodiments, system 600 may be server 1315 discussed in connection with FIG. 13.

OTT providers are unaware of the actual quality of the content they serve and therefore automatically encode all content items at a set MABR ladder. This uses up resources, such as bandwidth, streaming content which does not improve in quality based on this encoding. For example, an old TV program from 40 years ago may have a maximum resolution of 480p. However, OTT providers will encode even these old programs at a set MABR bitrate ladder. For example, they may encode the program and make it available in 4k, 720p, 480p, 360p, and 240p. In this example, the versions of the program encoded in 4k and 720p will visually look identical to the version encoded in 480p, since that is the program's maximum operating point. These encodings will also use up resources of the OTT provider's system. Therefore, a system is needed to include a message containing a quality metric indicative of the actual quality of the content item rather than the quality indicated by the metadata of the content item with the multiplexed data packets sent from the broadcaster to the OTT provider.

In some embodiments, satellite transponder uplink 901 and satellite transponder uplink 902 each correspond to a content broadcaster service. Each content broadcaster service operates such as broadcaster 501 discussed in connection with FIG. 5. Each of satellite 903 and satellite 904 operates such as satellite 503 discussed in connection with FIG. 5. Each of satellite transponder downlink 905 and of satellite transponder downlink 906 operate such as satellite transponder downlink 504.

In some embodiments, the multiplexed data packets are received by the OTT live service operator in the same way as in the IPTV system discussed in connection with FIG. 6. However, the OTT live service operator does not contain a segmenter/gapper and instead utilizes common media application format (CMAF) packager 912 and CMAF packager 911. Additionally, the OTT live service operator utilizes a different distribution system along with manifest changes.

In some embodiments, the quality score is multiplexed into MP2TS data packets as an SEI or SCTE 35 message. In these embodiments, ABR Transcoder 909 will read the SEI or SCTE 35 message for the quality score. ABR Transcoder 909 will send the quality score to CMAF packager 911. In some embodiments, the quality score is multiplexed into the MP2TS via MPEG7 or KLV data packets as MPEG7 or KLV metadata. In these embodiments, quality determination system 907 will demultiplex the streams to extract and parse the MPEG 7 or KLV metadata to retrieve the quality score. Quality determination system 907 will remultiplex the video, audio and any other streams and send those streams to Live ABR transcoder 909. The quality determination system will send CMAF packager 911 the quality score. CMAF packager 911 will report the quality score to OTT back office 913. OTT backoffice 913 will look up the ABR bitrate ladders for the quality score. OTT back office 913 will send CMAF packager 911 the packaging profile for the quality score. OTT back office 913 will also send ABR transcoder the ABR encoding profile for the content source resolution. The ABR transcoder will begin encoding the bitrate and qualities based on the received profile. The ABR packager receives the encoding streams, generates the manifest, and multiplexes the segments into a CMAF compliant format. CMAF packager 911 will generate the proper manifest update to indicate the change for the bitrate ladders for each resolution and framerate. CMAF packager 911 will write the manifest to CDN origin 915 and push each of the CMAF segments to CDN origin 915. CDN origin 915 will distribute the CMAF segments to all edge nodes 917. When ABR client devices 920 receives the updated live ABR manifest over the internet 918, ABR client devices 920 will adjust its segment request to CDN 916 based on the updated manifest and available bandwidth.

While the methods of FIG. 9 have been described as having been implemented by various hardware, it is seen that these methods could equally be implemented by an ABR application. For example, these methods may be implemented by media application discussed in connection with FIG. 12.

Figure 10:
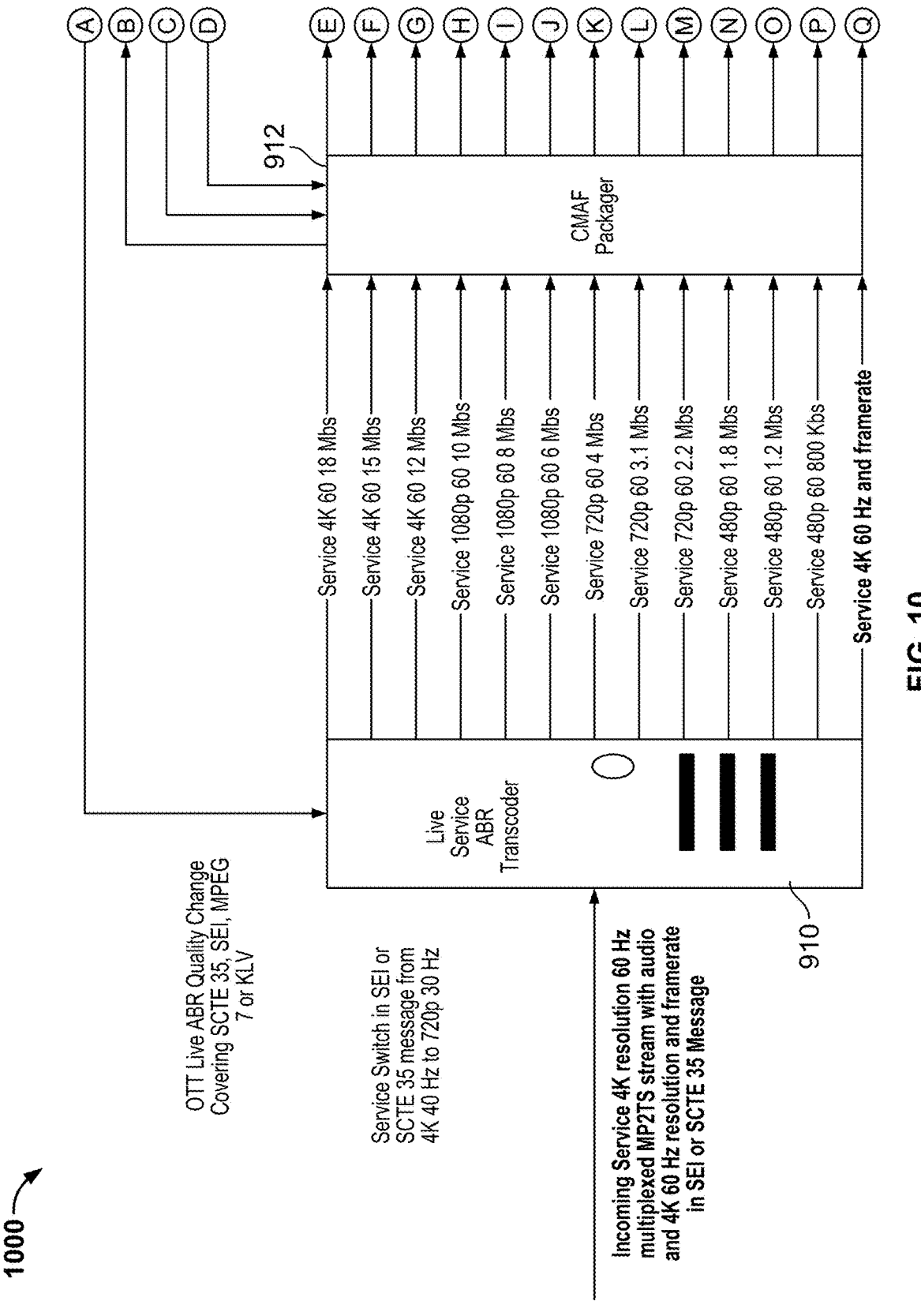
FIG. 10 shows a block diagram representing an example of an OTT system receiving a quality change, in accordance with some embodiments of the disclosure.

FIG. 10 shows a block diagram representing an example of an OTT system receiving a quality change when the quality score is multiplexed using an SEI or SCTE 35 message, in accordance with some embodiments of the disclosure.

In some embodiments, incoming service at ABR Live Service transcoder 910 is 4K 60 Hz and the SCTE 35 or SEI message indicates the source resolution and framerate is 4K 60 Hz. Live Service ABR transcoder 910 reads and extracts 4K resolution and 60 Hz framerate from the SCTE 35 or SEI message and passes that to CMAF Packager 911. CMAF packager 912 sends the service 4K resolution and 60 Hz framerate to OTT ABR back office 914. OTT Backoffice 914 looks up the ABR transcoding profile for a max quality for 4K 60 Hz. OTT Backoffice 914 sends the ABR encoding profile to ABR Live Service transcoder 910. At the same time, OTT back office 914 sends the encoding profiles for the bitrate ladders across the resolutions and framerates to CMAF Packager 912. ABR Live Service transcoder 910 begins encoding and different encoding profiles for each ladder for the resolutions and framerates. CMAF packager 912 receives the encoded streams, multiplexes each of the encoded video streams into a CMAF container format and writes the segments to CDN origin server 915. CMAF packager 912 writes the updated the manifest file according to the bitrate ladders for the resolutions and framerates. CMAF packager 912 continues to write the segments and update the manifest files based on the live segments being generated and distributed to CDN edge nodes 917.

In some embodiments, Live Service transcoder 909 represents the same system of MABR transcoder 910 in the situation where the user changes the program. The incoming stream is still 4K at 60 Hz however the SEI or SCTE 35 message indicates a change in resolution to 720p and a framerate of 30 Hz. Live Service ABR transcoder 909 reads and extracts 720p resolution and 30 Hz framerate from the SCTE 35 or SEI message and passes that to CMAF packager 911. CMAF packager 912 sends the Service 720p resolution and 30 Hz framerate to OTT Backoffice 913. OTT Backoffice 913 looks up the ABR transcoding profile for a max quality for 720p 30 Hz. The system then works as with the system in connection with MABR transcoder 910.

While the methods of FIG. 10 have been described as having been implemented by various hardware, it is seen that these methods could equally be implemented by an ABR application. For example, these methods may be implemented by media application discussed in connection with FIG. 12.

Figure 11:
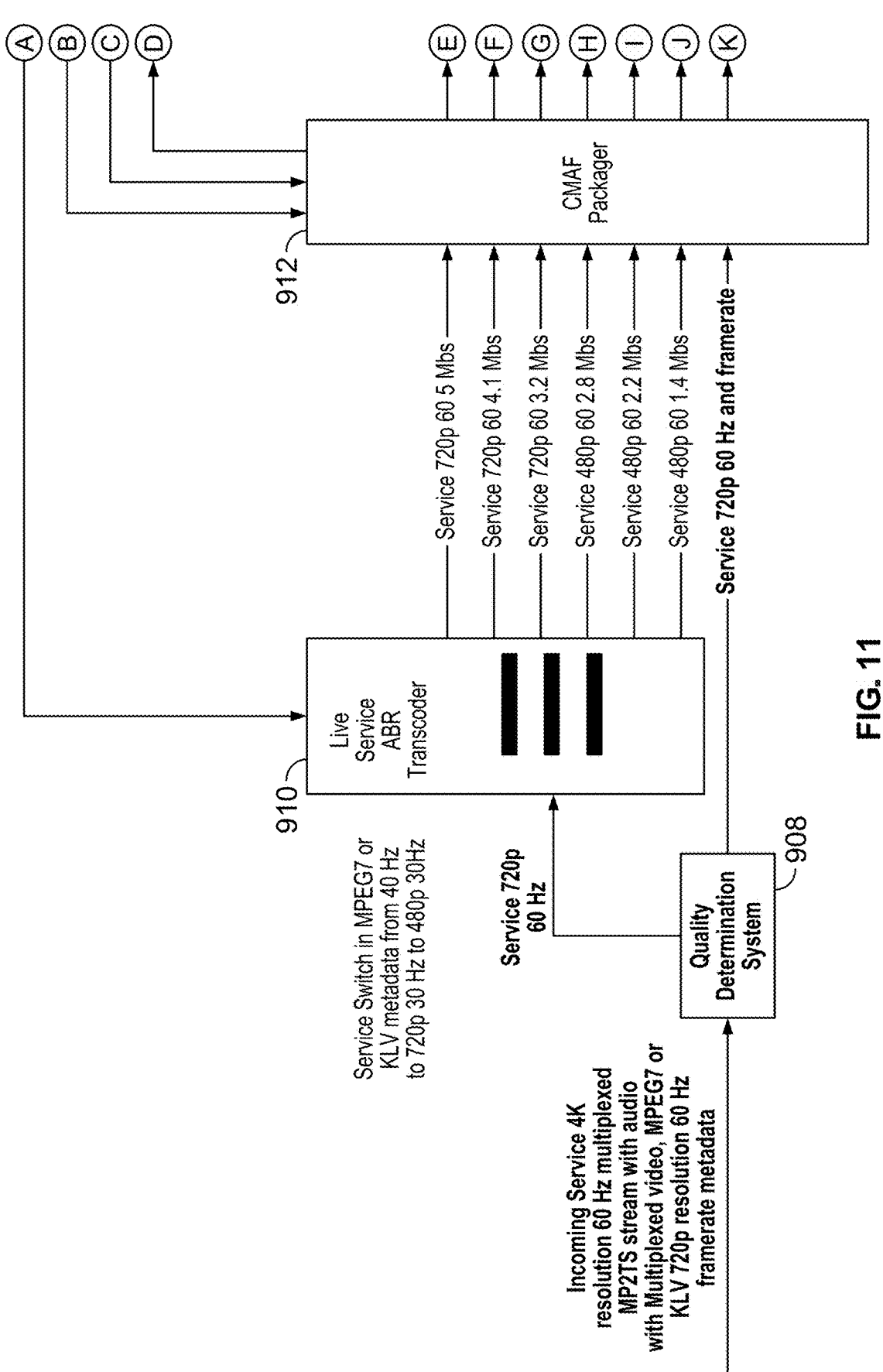
FIG. 11 shows a block diagram representing an example of an OTT system receiving a quality change, in accordance with some embodiments of the disclosure.

FIG. 11 shows a block diagram representing an example of an OTT system receiving a quality change when the quality score is multiplexed using MPEG7 or KLV metadata, in accordance with some embodiments of the disclosure.

Incoming service at ABR Live Service ABR transcoder 910 is 4K 60 Hz and the included multiplexed MPEG7 or KLV metadata indicates the source resolution and framerate is 720P 60 Hz. Quality determination system 908 will demultiplex the content to extract and parse the MPEG7 or KLV metadata to retrieve the quality score. The video, audio and any other stream will be multiplexed and sent to Live ABR transcoder 910. Quality determination system 908 will send the 720P resolution and 60 Hz source framerate to CMAF packager 912. CMAF packager 912 will send the service source resolution and framerate to OTT Backoffice 914. OTT Backoffice 914 will look up and retrieve the ABR encoding profile for 720P 60 Hz, OTT Backoffice 913 will send the ABR encoder profile for source quality 720p 60 Hz to Live Service ABR transcoder 909. At the same time, OTT back office 914 sends the encoding profiles for the bitrate ladders across the resolutions and framerates to CMAF Packager 912. CMAF packager 912 receives the encoded streams, multiplexes each of the encoded video streams into a CMAF container format and writes the segments to CDN origin server 915. CMAF packager 912 writes the updated the manifest file according to the bitrate ladders for the resolutions and framerates. CMAF packager 915 continues to write the segments and update the manifest file(s) based on the live segments being generated and distributed to CDN edge nodes 917.

At Live Service ABR transcoder 909, the MPEG7 or KLV metadata contained within the 4K 60p stream has the content source resolution at 480p at 30 Hz at an ad insertion point or a program change. The same process is repeated as in connection with the system of transcoder 910 adjusting to the new resolution of 480p and framerate of 30 Hz.

While the methods of FIG. 11 have been described as having been implemented by various hardware, it is seen that these methods could equally be implemented by an ABR application. For example, these methods may be implemented by media application discussed in connection with FIG. 12.

Figure 12:
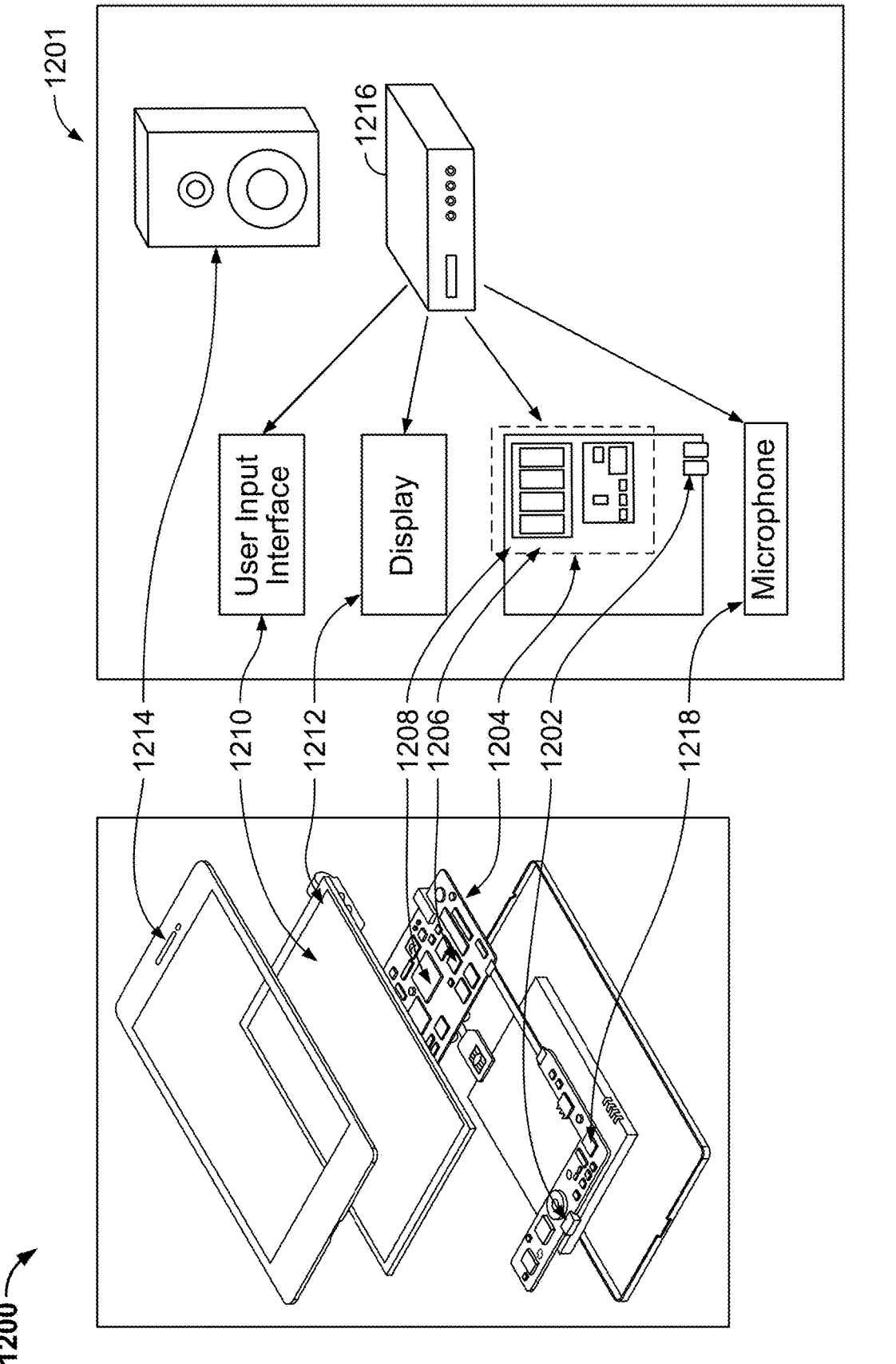
FIGS. 12-13 describe exemplary devices, systems, servers, and related hardware for streaming content in a low latency system, in accordance with some embodiments of the present disclosure.
Figure 13:
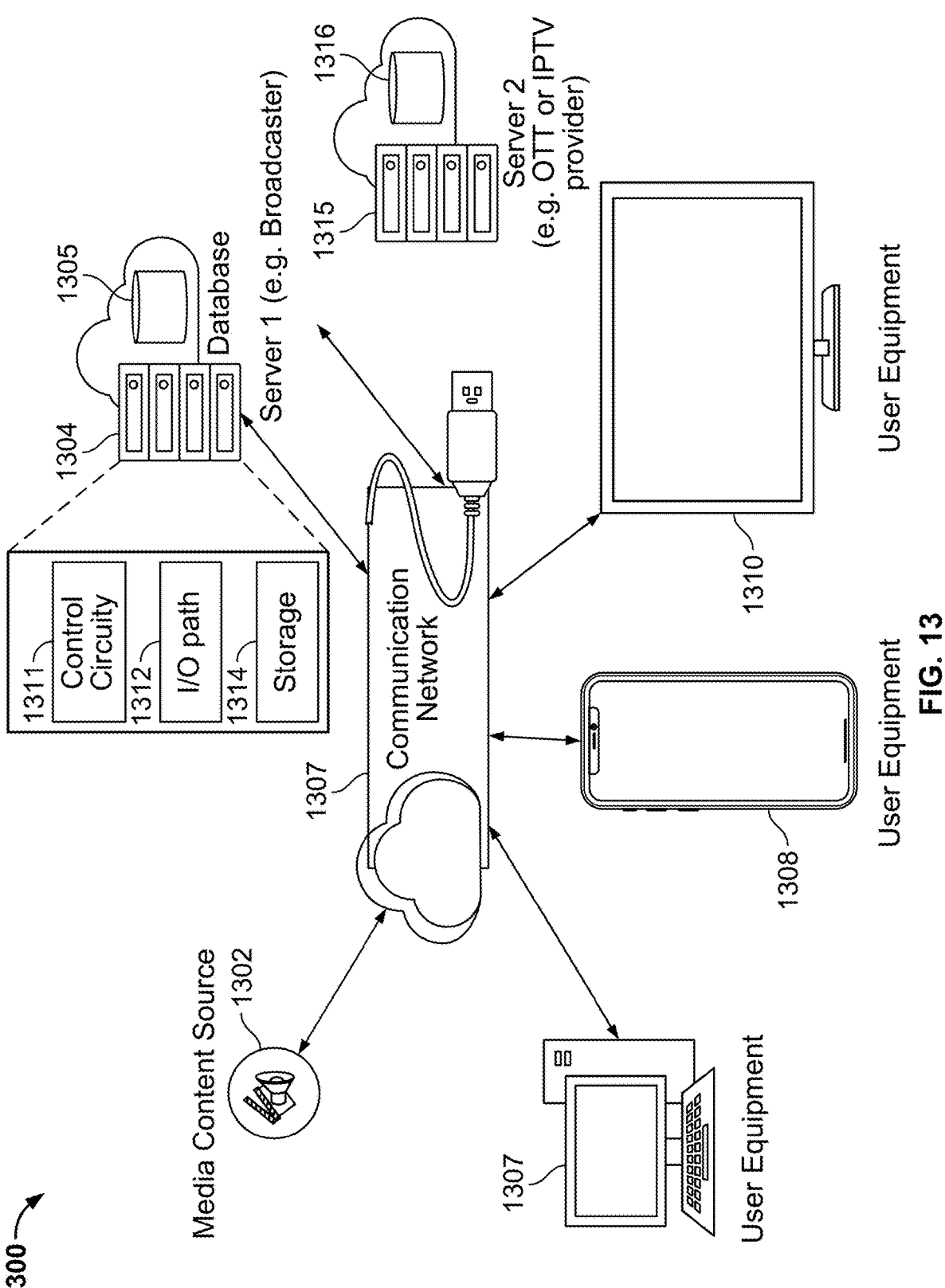

FIGS. 12-13 describe exemplary devices, systems, servers, and related hardware for streaming content in a low latency system, in accordance with some embodiments of the present disclosure. FIG. 12 shows generalized embodiments of illustrative user equipment devices 1200 and 1201. For example, user equipment device 1200 may be a smartphone device. In another example, user equipment system 1201 may be a user television equipment system. User television equipment system 1201 may include set-top box 1216. Set-top box 1216 may be communicatively connected to microphone 1218, speaker 1214, and display 1212. In some embodiments, microphone 1218 may receive voice commands for the media application. In some embodiments, display 1212 may be a television display or a computer display. In some embodiments, set-top box 1216 may be communicatively connected to user input interface 1210. In some embodiments, user input interface 1210 may be a remote control device. Set-top box 1216 may include one or more circuit boards. In some embodiments, the circuit boards may include processing circuitry, control circuitry, and storage (e.g., RAM, ROM, Hard Disk, Removable Disk, etc.). In some embodiments, the circuit boards may include an input/output path. More specific implementations of user equipment devices are discussed below in connection with FIG. 12. Each one of user equipment device 1200 and user equipment system 1201 may receive content and data via input/output ("I/O") path 1202. I/O path 1202 may provide content (e.g., broadcast programming, on-demand programming, Internet content, content available over a local area network (LAN) or wide area network (WAN), and/or other content) and data to control circuitry 1204, which includes processing circuitry 1206 and storage 1208. Control circuitry 1204 may be used to send and receive commands, requests, and other suitable data using I/O path 1202, which may comprise I/O circuitry. I/O path 1202 may connect control circuitry 1204 (and specifically processing circuitry 1206) to one or more communications paths (described below). I/O functions may be provided by one or more of these communications paths, but are shown as a single path in FIG. 12 to avoid overcomplicating the drawing. Control circuitry 1204 may be based on any suitable processing circuitry such as processing circuitry 1206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1204 executes instructions for a media application stored in memory (i.e., storage 1208). Specifically, control circuitry 1204 may be instructed by the media application to perform the functions discussed above and below. In some implementations, any action performed by control circuitry 1204 may be based on instructions received from the media application.

In client/server-based embodiments, control circuitry 1204 may include communications circuitry suitable for communicating with a media application server or other networks or servers. The instructions for carrying out the above mentioned functionality may be stored on a server (which is described in more detail in connection with FIG. 12. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 12). In addition, communications circuitry may include circuitry that enables peer-to-peer communication of user equipment devices, or communication of user equipment devices in locations remote from each other (described in more detail below).

Memory may be an electronic storage device provided as storage 1208 that is part of control circuitry 1204. As referred to herein, the phrase "electronic storage device" or "storage device" should be understood to mean any device for storing electronic data, computer software, or firmware, such as random-access memory, read-only memory, hard drives, optical drives, digital content item disc (DVD) recorders, compact disc (CD) recorders, BLU-RAY disc (BD) recorders, BLU-RAY 3D disc recorders, digital content item recorders (DVR, sometimes called a personal content item recorder, or PVR), solid state devices, quantum storage devices, gaming consoles, gaming media, or any other suitable fixed or removable storage devices, and/or any combination of the same. Storage 1208 may be used to store various types of content described herein as well as media application data described above. Nonvolatile memory may also be used (e.g., to launch a boot-up routine and other instructions). Cloud-based storage, described in relation to FIG. 12, may be used to supplement storage 1208 or instead of storage 1208.

Control circuitry 1204 may include content item generating circuitry and tuning circuitry, such as one or more analog tuners, one or more MPEG-2 decoders or other digital decoding circuitry, high-definition tuners, or any other suitable tuning or content item circuits or combinations of such circuits. Encoding circuitry (e.g., for converting over-the-air, analog, or digital signals to MPEG signals for storage) may also be provided. Control circuitry 1204 may also include scaler circuitry for upconverting and downconverting content into the preferred output format of user equipment 1200. Circuitry 1204 may also include digital-to-analog converter circuitry and analog-to-digital converter circuitry for converting between digital and analog signals. The tuning and encoding circuitry may be used by user equipment device 1200, 1201 to receive and to display, to play, or to record content. The tuning and encoding circuitry may also be used to receive guidance data. The circuitry described herein, including for example, the tuning, content item generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1208 is provided as a separate device from user equipment device 1200, the tuning and encoding circuitry (including multiple tuners) may be associated with storage 1208.

A user may send instructions to control circuitry 1204 using user input interface 1210. User input interface 1210 may be any suitable user interface, such as a remote control, mouse, trackball, keypad, keyboard, touch screen, touchpad, stylus input, joystick, voice recognition interface, or other user input interfaces. Display 1212 may be provided as a stand-alone device or integrated with other elements of each one of user equipment device 1200 and user equipment system 1201. For example, display 1212 may be a touch-screen or touch-sensitive display. In such circumstances, user input interface 1210 may be integrated with or combined with display 1212. Display 1212 may be one or more of a monitor, a television, a display for a mobile device, or any other type of display. A content item card or graphics card may generate the output to display 1212. The content item card may be any processing circuitry described above in relation to control circuitry 1204. The content item card may be integrated with the control circuitry 1204. Speakers 1214 may be provided as integrated with other elements of each one of user equipment device 1200 and user equipment system 1201 or may be stand-alone units. The audio component of content items and other content displayed on display 1212 may be played through the speakers 1214. In some embodiments, the audio may be distributed to a receiver (not shown), which processes and outputs the audio via speakers 1214.

The media application may be implemented using any suitable architecture. For example, it may be a stand-alone application wholly-implemented on each one of user equipment device 1200 and user equipment system 1201. In such an approach, instructions of the application are stored locally (e.g., in storage 1208), and data for use by the application is downloaded on a periodic basis (e.g., from an out-of-band feed, from an Internet resource, or using another suitable approach). Control circuitry 1204 may retrieve instructions of the application from storage 1208 and process the instructions to rearrange the segments as discussed. Based on the processed instructions, control circuitry 1204 may determine what action to perform when input is received from user input interface 1210. For example, movement of a cursor on a display up/down may be indicated by the processed instructions when user input interface 1210 indicates that an up/down button was selected.

In some embodiments, the media application is a client/ server-based application. Data for use by a thick or thin client implemented on each one of user equipment device 1200 and user equipment system 1201 is retrieved on-demand by issuing requests to a server remote to each one of user equipment device 1200 and user equipment system 1201. In one example of a client/server-based guidance application, control circuitry 1204 runs a web browser that interprets web pages provided by a remote server. For example, the remote server may store the instructions for the application in a storage device. The remote server may process the stored instructions using circuitry (e.g., control circuitry 1204) to perform the operations discussed in connection with FIGS. 1-11.

In some embodiments, the media application may be downloaded and interpreted or otherwise run by an interpreter or virtual machine (run by control circuitry 1204). In some embodiments, the media application may be encoded in the ETV Binary Interchange Format (EBIF), received by the control circuitry 1204 as part of a suitable feed, and interpreted by a user agent running on control circuitry 1204. For example, the media application may be an EBIF application. In some embodiments, the media application may be defined by a series of JAVA-based files that are received and run by a local virtual machine or other suitable middleware executed by control circuitry 1204. In some of such embodiments (e.g., those employing MPEG-2 or other digital media encoding schemes), the media application may be, for example, encoded and transmitted in an MPEG-2 object carousel with the MPEG audio and content item packets of a program.

FIG. 13 is a diagram of an illustrative streaming system, in accordance with some embodiments of the disclosure. User equipment devices 1307, 1307, 1310 (e.g., user equipment device 106) may be coupled to communication network 1306. Communication network 1306 may be one or more networks including the Internet, a mobile phone network, mobile voice or data network (e.g., a 4G or LTE network), cable network, public switched telephone network, or other types of communication network or combinations of communication networks. Paths (e.g., depicted as arrows connecting the respective devices to the communication network 1306) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 13 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 1306.

System 1300 includes a media content source 1302, server 1304, which may comprise or be associated with database 1305, and server 1315 which may comprise or be associated with database 1316. Communications with media content source 1302 and server 1304 may be exchanged over one or more communications paths but are shown as a single path in FIG. 13 to avoid overcomplicating the drawing. In addition, there may be more than one of each of media content source 1302 and server 1304, but only one of each is shown in FIG. 13 to avoid overcomplicating the drawing. If desired, media content source 1302 and server 1304 may be integrated as one source device.

In some embodiments, server 1304 may be a broadcaster server. In some embodiments, server 1315 may be a OTT or IPTV provider. In some embodiments, server 1304 may include control circuitry 1311 and a storage 1314 (e.g., RAM, ROM, Hard Disk, Removable Disk, etc.). Server 1304 may also include an input/output path 1312. I/O path 1312 may provide device information, or other data, over a local area network (LAN) or wide area network (WAN), and/or other content and data to the control circuitry 1311, which includes processing circuitry, and storage 1314. The control circuitry 1311 may be used to send and receive commands, requests, and other suitable data using I/O path 1312, which may comprise I/O circuitry. I/O path 1312 may connect control circuitry 1304 (and specifically processing circuitry) to one or more communications paths. In some embodiments, server 1315 may have all the same components of server 1304. Control circuitry 1311 may be based on any suitable processing circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 1311 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 1311 executes instructions for an emulation system application stored in memory (e.g., the storage 1314). Memory may be an electronic storage device provided as storage 1314 that is part of control circuitry 1311.

Server 1304 may retrieve guidance data from media content source 1302, process the data as will be described in detail below, and forward the data to \ user equipment devices 1307 and 1310. Media content source 1302 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 1302 may be the originator of content (e.g., a television broadcaster, a Webcast provider, etc.) or may not be the originator of content (e.g., an on-demand content provider, an Internet provider of content of broadcast programs for downloading, etc.). Media content source 1302 may include cable sources, satellite providers, on-demand providers, Internet providers, over-the-top content providers, or other providers of content. Media content source 1302 may also include a remote media server used to store different types of content (including content item content selected by a user), in a location remote from any of the client devices. Media content source 1302 may also provide metadata that can be used to identify important segments of media content as described above.

Client devices may operate in a cloud computing environment to access cloud services. In a cloud computing environment, various types of computing services for content sharing, storage or distribution (e.g., content item sharing sites or social networking sites) are provided by a collection of network-accessible computing and storage resources, referred to as "the cloud." For example, the cloud can include a collection of server computing devices (such as, e.g., server 1304), which may be located centrally or at distributed locations, that provide cloud-based services to various types of users and devices connected via a network such as the Internet via communication network 1306. In such embodiments, user equipment devices may operate in a peer-to-peer manner without communicating with a central server.

FIG. 14 shows a flowchart of illustrative steps 1400 involved in selecting an ABR ladder for a user uploaded content item, in accordance with some embodiments of the present disclosure.

At 1401, a user device uploads a content item. For example, the video may be merged content item 107 discussed in connection with FIG. 1. At 1402, control circuitry identifies a plurality of time portions in the content item. At 1403, for each of these time portions, the control circuitry assess a quality score which is based on an analysis of visual characteristics of at least one frame of the time portion. In some embodiments, the quality score may be determined as in step 204 discussed in connection with FIG. 2.

At 1404, for each of the time portions, the control circuitry generates an ABR ladder by selecting a set of bitrates for each time portion and encoding the time portion into encoded portions at each bitrate. In some embodiments, the ABR ladder may be ABR ladder 1 or ABR ladder 2 discussed in connection with FIG. 1. In some embodiments, the ABR ladder may be bitrate-resolution ladder 207 or bitrate-resolution ladder 208 discussed in connection with FIG. 2. At 1405, the control circuitry makes the content item available for streaming use each respective ABR ladder for each respective time portion. In some embodiments, the video is made available as in step 7 discussed in connection with FIG. 1.

FIG. 15 shows a flowchart of illustrative steps 1500 involved in an IPTV system selecting an ABR ladder for a content item, in accordance with some embodiments of the present disclosure. In some embodiments, the IPTV system may be system 600 discussed in connection with FIG. 6. In some embodiments, the IPTV system may be server 1315 discussed in connection with FIG. 13.

At 1501, the IPTV system accesses content item from a source. In some embodiments, the source may be media content source 1302 discussed in connection with FIG. 13. At 1502, the broadcaster accesses a quality score for the content item. In some embodiments, this quality score may be a bitrate, framerate and/or a resolution of the content item. At 1503, the broadcaster encodes the content item into data packets and multiplexes a message indicating the quality score into the data packets. At 1504, the broadcaster transmits the data packets to a headend. In some embodiments, the headend is an IPTV headend. In some embodiments, the headend is one which supports IPTV over data over cable interface specification (DOCIS).

At 1505, a quality determination system at the headend determines the quality score from the message multiplexed into the data packets. In some embodiments, the quality determination system may be quality determination system 607 or 608 discussed in connection with FIGS. 6-8. At 1506, the backoffice of the headend selects a set of bitrates for the content item is based on the quality score. In some embodiments, the backoffice may be backoffice 613 or 614 discussed in connection with FIGS. 6-8. At 1507, an ABR transcoder at the headend transcodes the content item into a plurality of streams, where each stream corresponds to a respective bitrate from the set of bitrates. In some embodiments, the ABR transcoder may be Live MABR transcoder 609 or 610 discussed in connection with FIGS. 6-8. At 1508, the backoffice selects a plurality of network addresses, where each network address corresponds to a corresponding bitrate front eh bitrate ladder. At 1509 a gapper of the headend makes each stream available at each respective address. At 1510, the backoffice transmits the plurality of network addresses to a user gateway so that the gateway may provide the streams to a user IPTV device. In some embodiments, the user gateway may be gateway or cable modem 619 discussed in connection with FIGS. 6-8

FIG. 16 shows a flowchart of illustrative steps involved in an OTT system selecting an ABR ladder for a content item, in accordance with some embodiments of the present disclosure. In some embodiments, the OTT system may be system 900 discussed in connection with FIG. 9. In some embodiments, the OTT system may be server 1315 discussed in connection with FIG. 13.

At 1501, the IPTV system accesses content item from a source. In some embodiments, the source may be media content source 1302 discussed in connection with FIG. 13. At 1502, the broadcaster accesses a quality score for the content item. In some embodiments, this quality score may be a bitrate or a resolution of the content item. At 1503, the broadcaster encodes the content item into data packets and multiplexes a message indicating the quality score into the data packets. At 1604, the broadcaster transmits the data packets to an OTT provider.

At 1605, a quality determination system at the OTT provider determines the quality score from the message multiplexed into the data packets. In some embodiments, the quality determination system may be quality determination system 907 or 908 discussed in connection with FIGS. 9-11. At 1606, the backoffice of the headend selects a set of bitrates for the content item based on the quality score. In some embodiments, the backoffice may be backoffice 913 or 914 discussed in connection with FIGS. 9-11. At 1607, a Live Service ABR Transcoder at the OTT provider transcodes the content item data into a plurality of transcoded portions, where each transcoded portion corresponds to a respective bitrate from the set of bitrates. In some embodiments, the transcoder may be Live Service ABR transcoder 909 or 910 discussed in connection with FIGS. 9-11. At 1608, the packager at the OTT provider generates a manifest indicating a respective portion of a uniform resource locator (URL) for each respective encoded portion. At 1609, the OTT provider transmits the manifest to a client device.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   receiving, at a quality determination system of an over-the-top (OTT) provider from a broadcaster, data packets, wherein the broadcaster was configured to:
      access a content item from a source;
      access a quality score of the content item;
      encode the content item to generate a broadcaster-encoded content item;
      multiplex a message indicating the quality score into a plurality of data packets that comprise at least a part of the broadcaster-encoded content item; and
      transmit the data packets to the OTT provider;
   identifying, by the quality determination system of the OTT provider, the quality score based on the message multiplexed into the plurality of data packets;
   selecting, by a backoffice of the OTT provider, a set of bitrates for the content item based on the quality score;
   encoding, by an adaptive bitrate (ABR) transcoder of the OTT provider, for each respective bitrate of the set of bitrates a respective plurality of encoded portions based on content item data from the plurality of data packets;
   generating, by a packager of the OTT provider, a manifest indicating, for each encoded portion of each respective plurality of encoded portions, at least a respective encoded portion of a uniform resource locator (URL); and
   transmitting, by the OTT provider, the manifest to the client device.

2. The method of claim 1 wherein the quality score comprises one or more of a resolution of the content item, a framerate of the content item, or a bitrate of the content item.

3. The method of claim 1 wherein the message indicating the quality score comprises one of a supplemental enhancement (SEI) message, a society of cable telecommunications engineers (SCTE) message or a moving picture experts group (MPEG-7) metadata message.

4. The method of claim 1 wherein identifying the quality score of the content item comprises receiving the message, wherein the message is based on performing an analysis of visual characteristics of at least one frame of the respective time portion.

5. The method of claim 4 wherein the performing an analysis of visual characteristics of at least one frame of the respective time portion comprises determining a resolution of the video based on a color of a plurality of pixels in the at least one frame.

6. The method of claim 1 further comprising transmitting the manifest to the client device by:
   writing, by a packager of the OTT provider, the manifest to a content delivery network (CDN) origin;
   transmitting the plurality of encoded portions to the CDN origin;
   distributing, by the CDN origin, the plurality of encoded portions to a plurality of edge nodes.

7. A system comprising:
   a quality determination system of an over-the-top (OTT) provider configured to:
      receiving, from a broadcaster, data packets, wherein the broadcaster was configured to:
         access a content item from a source;
         access a quality score of the content item;
         encode the content item to generate a broadcaster-encoded content item;
         multiplex a message indicating the quality score into a plurality of data packets that comprise at least a part of the broadcaster-encoded content item; and
         transmit the data packets to the OTT provider; and
      identify the quality score based on the message multiplexed into the plurality of data packets;
   the backoffice of the OTT provider configured to select a set of bitrates for the content item based on the quality score;
   an adaptive bitrate (ABR) transcoder of the OTT provider configured to encode for each respective bitrate of the set of bitrates a respective plurality of encoded portions based on content item data from the plurality of data packets;
   a packager of the OTT provider configured to generate a manifest indicating, for each encoded portion of each respective plurality of encoded portions, at least a respective encoded portion of a uniform resource locator (URL); and
   the OTT provider configured to transmit the manifest to the client device.

8. The system of claim 7 wherein the quality score comprises one or more of a resolution of the content item, a framerate of the content item, or a bitrate of the content item.

9. The system of claim 7 wherein the message indicating the quality score comprises one of a supplemental enhancement (SEI) message, a society of cable telecommunications engineers (SCTE) message or a moving picture experts group (MPEG-7) metadata message.

10. The system of claim 7 wherein the quality determination system is configured to identify the quality score by receiving the message, wherein the message is based on performing an analysis of visual characteristics of at least one frame of the respective time portion.

11. The system of claim 10 wherein the quality determination system is configured to identify the quality score based on the message by receiving the message, wherein performing an analysis of visual characteristics of at least one frame of the respective time portion comprises determining a resolution of the video based on a color of a plurality of pixels in the at least one frame.

12. The system of claim 7 wherein the packager of the OTT provider is further configured to transmit the manifest to the client device by:

writing the manifest to a content delivery network (CDN) origin; and transmitting the plurality of encoded portions to the CDN origin; and the CDN origin configured to distribute the plurality of encoded portions to a plurality of edge nodes.

\*   \*   \*   \*   \*